United States Patent
Ginde et al.

(10) Patent No.: US 8,077,626 B2
(45) Date of Patent: Dec. 13, 2011

(54) QUALITY OF SERVICE (QOS) AWARE ESTABLISHMENT OF COMMUNICATION SESSIONS

(75) Inventors: Samir Vijay Ginde, San Diego, CA (US); Srinivasan Balasubramanian, San Diego, CA (US); Anup Kuzhiyil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 11/673,289

(22) Filed: Feb. 9, 2007

(65) Prior Publication Data

US 2008/0013544 A1    Jan. 17, 2008

Related U.S. Application Data

(60) Provisional application No. 60/830,851, filed on Jul. 14, 2006, provisional application No. 60/830,845, filed on Jul. 14, 2006.

(51) Int. Cl.
- *H04L 12/66* (2006.01)
- *H04L 12/28* (2006.01)
- *H04L 12/56* (2006.01)
- *G06F 15/16* (2006.01)

(52) U.S. Cl. ............... 370/252; 370/352; 370/395.21

(58) Field of Classification Search .................. None
See application file for complete search history.

(56) References Cited

U.S. PATENT DOCUMENTS

| | | | |
|---|---|---|---|
| 5,898,668 A * | 4/1999 | Shaffer | 370/230 |
| 6,751,477 B1 | 6/2004 | Alperovich et al. | |
| 7,002,992 B1 * | 2/2006 | Shaffer et al. | 370/468 |
| 7,023,839 B1 * | 4/2006 | Shaffer et al. | 370/356 |
| 2001/0026554 A1 * | 10/2001 | Holler et al. | 370/401 |
| 2003/0189900 A1 * | 10/2003 | Barany et al. | 370/229 |
| 2004/0114604 A1 * | 6/2004 | Belgardt et al. | 370/395.21 |
| 2004/0139088 A1 * | 7/2004 | Mandato et al. | 707/100 |
| 2005/0157660 A1 * | 7/2005 | Mandato et al. | 370/254 |
| 2006/0256810 A1 * | 11/2006 | Yarlagadda et al. | 370/465 |
| 2007/0133516 A1 * | 6/2007 | Stein | 370/352 |
| 2008/0069086 A1 * | 3/2008 | Shin et al. | 370/352 |
| 2008/0081648 A1 * | 4/2008 | Kang et al. | 455/500 |

(Continued)

FOREIGN PATENT DOCUMENTS

JP    4129466 A    4/1992

(Continued)

OTHER PUBLICATIONS

International Search Report—PCT/US07/073351, International Search Authority—European Patent Office—Nov. 22, 2007.

(Continued)

*Primary Examiner* — Chirag Shah
*Assistant Examiner* — Suk Jin Kang
(74) *Attorney, Agent, or Firm* — Kenyon S. Jenckes

(57) ABSTRACT

In general, this disclosure relates to the establishment of communication sessions between communication devices. In particular, this disclosure describes techniques that provide for quality of service (QoS) aware establishment of communication sessions. As an example, a communication device may attempt to reserve QoS for one or more codecs using a QoS reservation procedure corresponding to the access technology of an access network via which the communication device accesses a core network. The communication device selects one or more codecs to include in a call control message, such a Session Description Protocol (SDP) message, based on the QoS reservation and a QoS mode of the device.

30 Claims, 10 Drawing Sheets

U.S. PATENT DOCUMENTS

2008/0192763 A1* 8/2008 Davis et al. .................. 370/412
2009/0103530 A1* 4/2009 Fartmann et al. ............. 370/389

FOREIGN PATENT DOCUMENTS

| | | |
|---|---|---|
| JP | 11252660 A | 9/1999 |
| JP | 2002359651 A | 12/2002 |
| JP | 2004222009 A | 8/2004 |
| JP | 2004228660 A | 8/2004 |
| JP | 2004349880 A | 12/2004 |
| JP | 2005236388 A | 9/2005 |
| JP | 2005260649 A | 9/2005 |
| JP | 2005286894 A | 10/2005 |
| JP | 2005533444 T | 11/2005 |
| WO | 0251092 | 6/2002 |
| WO | 2006065025 | 6/2006 |
| WO | WO2006057381 A1 | 6/2006 |

OTHER PUBLICATIONS

"Written Opinion—PCT/US2007/073351, International Search Authority, European Patent Office, Nov. 22, 2007".

* cited by examiner

QUALITY OF SERVICE (QOS) AWARE ESTABLISHMENT OF COMMUNICATION SESSIONS This application claims priority to U.S. Provisional Patent Application No. 60/830,851 filed Jul. 14, 2006 and U.S. Provisional Patent Application No. 60/830,845 filed Jul. 14, 2006.

TECHNICAL FIELD

This disclosure relates to establishment of communication sessions between communication devices.

BACKGROUND

Session Initiation Protocol (SIP) is an application layer signaling and control protocol for establishing and managing delivery of Internet Protocol (IP)-based telephony services in a packet-based network. SIP provides user authentication, redirect and registration services, and can be used to support a variety of telephony services such as audio or video conferencing, text messaging, interactive gaming, and call forwarding. The SIP protocol is described in Request for Comment (RFC) 3261, published in 2002, and prepared by the Internet Engineering Task Force (IETF).

SIP provides several functions for the setup, modification, and termination of sessions. In particular, SIP provides a system of rules for creating, modifying, and terminating sessions over the Internet. SIP is based on an HTTP-like request and response transaction model. Each transaction consists of a request that invokes a particular function and at least one response. SIP can operate over any transport protocol. In other words, the details of data exchanged within a session, e.g., the coder-decoder (codec) used in the session, are not controlled by SIP. Instead, SIP is compatible with other protocols to build a multimedia architecture that can provide complete services to end users.

SUMMARY

In general, this disclosure relates to establishment of communication sessions between communication devices. In particular, this disclosure describes techniques that provide for establishment of communication sessions with quality of service (QoS).

As an example, a communication device may attempt to reserve QoS for one or more codecs using an access technology-specific QoS reservation procedure. The communication device selects one or more codecs to include in a session description within a call control message, such as one created by the Session Description Protocol (SDP), based on the QoS reservation and a QoS mode of the device.

The communication device generates a list of codecs that are supported by the communication device and compares QoS requirements of the listed codecs with the QoS that was reserved. The communication device removes the codecs that have QoS requirements that are greater than the QoS reserved by the device. If sufficient QoS has been reserved for one or more of the codecs, the device generates an SDP offer that includes at least one of the selected codecs.

If the communication is operating as an originating device of a communication session, the SDP message (e.g., an SDP offer) may include all the codecs for which QoS has been reserved. If the communication device is operating as a terminating device of the communication session, the SDP message (e.g., SDP answer) may include only a single codec for which QoS has been reserved, e.g., the codec with the highest priority for which QoS has been reserved. In this manner, selection of codecs to include in the SDP message depends on the QoS reserved by the communication device.

If there are no codecs that have QoS requirements that are less than or equal to the reserved QoS, the communication device determines the QoS mode of device. If the communication device is operating in a QoS mode that requires reservation of sufficient QoS before a communication session can be established, the device aborts the session establishment. If the communication device is operating in a QoS mode that prefers sufficient QoS to be reserved, but operates using best-effort QoS when insufficient QoS is reserved, the device selects at least one of the codecs supported by the device and includes the selected codec in an SDP message. As an example, the communication device may include all the codecs that are supported by the device when the device is operating as an originating device of the communication session, e.g., when the device is sending an SDP offer. In this manner, selection of codecs to include in the SDP message depends on the QoS configuration mode of the communication device.

The techniques of this disclosure thus provide for QoS aware communication session establishment. Moreover, the techniques may be utilized for applications running over various underlying access technologies. For example, the same techniques may be used to establish communication sessions for a communication device running over a wireless local area network (WLAN) and a communication device operating over a 1xEvolution-Data Optimized (1xEV-DO) network. In this manner, the techniques operate as a single implementation that works over different access technologies.

In one aspect, a method comprises selecting a quality of service (QoS) mode for a communication device and selecting one or more codecs suitable for use in a communication session based on the selected QoS mode.

In another aspect, a communication device comprises a plurality of codecs, a codec selection module that selects one or more of the plurality of codecs that are suitable for use in a communication session based on a Quality of Service (QoS) mode of the device, and a processor that generates a call control message that identifies the codecs selected by the codec selection module.

In a further aspect, a computer program product comprises a computer-readable medium that includes code to cause a computer to select a quality of service (QoS) mode for a communication device and code to cause a computer to select one or more codecs suitable for use in a communication session based on the selected QoS mode.

In yet another aspect, a communication device comprises means for selecting a quality of service (QoS) mode for a communication device and means for selecting one or more codecs suitable for use in a communication session based on the selected QoS mode.

The techniques described in this disclosure may be implemented in a communication apparatus in hardware, software, firmware, or any combination thereof. If implemented in software, the software may be executed in a computer. The software may be initially stored as instructions, program code, or the like. Accordingly, the disclosure also contemplates a computer program product for digital video encoding comprising a computer-readable medium, wherein the computer-readable medium comprises codes for causing a computer to execute techniques and functions in accordance with this disclosure.

The details of one or more examples of the techniques of this disclosure are set forth in the accompanying drawings and the description below. Other features, objects, and advantages of this disclosure will be apparent from the description and drawings, and from the claims.

DETAILED DESCRIPTION

Figure 1:
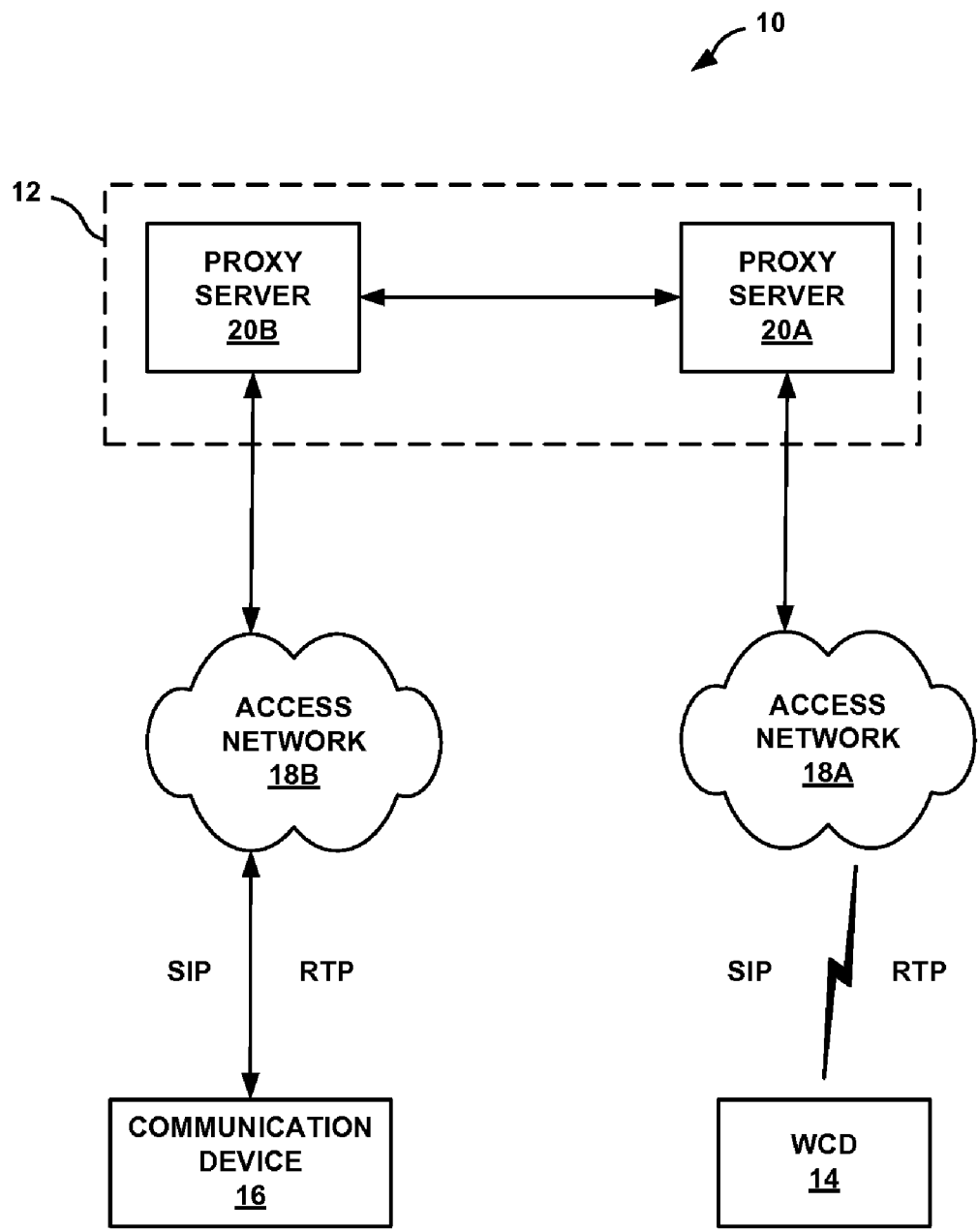
FIG. 1 is a block diagram illustrating a system for management of communication sessions between a wireless communication device (WCD) and a communication device.

In general, this disclosure relates to establishment of communication sessions between communication devices. In particular, this disclosure describes techniques that provide for establishment of communication sessions with quality of service (QoS).

As an example, a communication device may attempt to reserve QoS for one or more codecs using an access technology-specific QoS reservation procedure. For example, QoS reservation by an Access Terminal (AT) in an EV-DO network involves the exchange of QoS reservation requests between the AT and the EV-DO Access Network (AN). The AT sends requests for QoS to the network, and the network allocates and grants the required resources for this request. The AT requests bidirectional QoS by using the attributes ReservationKKQoSResquestFwd and ReservationKKQoSResquestRev, respectively, of the Multiflow Packet Application protocol. The AT specifies a QoS "profile" by identifying it with a standardized ProfileId such as the ProfileId 256 for the EVRC family of Voice over IP (VoIP) codecs. When a QoSRequest is made, it is for a particular IP flow, called a Reservation. Each IP flow is assigned a reservation label by the AT, which is used to identify the QoSRequest and IP flow.

The AN responds to QoS request with the ReservationKKQoSResponse message, creates and configures the wireless link (called "link flow") according to the negotiated QoS and then binds the link flow to the reservation label. The AT requests the reservation to be turned "on" or activated when it wishes to actually use the network resources. Otherwise, the QoS configuration remains as state in the network, identified by its reservation label, although no resources are actually being used.

Resources are reserved in the Packet Data Serving Node (PDSN), the network node by which the AT access the IP core network. To this end, the AT sends Resource Reservation Protocol (RSVP) RESV messages to create/delete or modify the Traffic Flow Templates (TFTs) at the PDSN. Each TFT may contain one or more packet filters corresponding to various IP flows. The TFTs request a particular handling of traffic at the PDSN, to meet the QoS requirements of the service that intends to use the IP flow. The PDSN accepts the resource reservation with the RSVP RESVConf message.

As another example, the reservation of QoS in the WLAN environment may be based on the IEEE 802.11e standard. The TSPEC is the primary mechanism for communication of QoS parameters. The TSPEC is the specification of the Wi-Fi handset's (QoS Station or QSTA) desired QoS configuration in terms of well-defined parameters such as minimum and maximum data rates. QSTAs send TSPEC requests to the QoS access point (QAP) in the form of an ADDTS (Add TSPEC) request. The QSTA requests TSPEC for both upstream (from QSTA to QAP) and downstream (QAP to QSTA) flows. The QAP evaluates if there are available resources to meet the requested TSPEC. The QAP can respond by offering the QSTA an alternate TSPEC (perhaps with lower performance QoS parameters), or it may deny the TSPEC request entirely. Once a TSPEC has been established, it may be used for data transfer, and the QAP will meet the TSPECs QoS parameters to the maximum extent possible.

As used herein, QoS refers to the capability of a network to provide a particular prioritized handling of a service in accordance with dedicated bandwidth, transmission rate, coding rate, controlled jitter and latency, improved loss characteristics, and the like. The communication device selects one or more codecs to include in a session description within a call control message, such as one created by the Session Description Protocol (SDP), based on the QoS reservation and a QoS mode of the device.

The communication device generates a list of codecs that are supported by the communication device and compares QoS requirements of the listed codecs with the QoS that was reserved. The communication device removes the codecs that have QoS requirements that are greater than the QoS reserved by the device. If sufficient QoS has been reserved for one or more of the codecs, the device generates an SDP message that includes at least one of the selected codecs. The communication device determines that sufficient QoS has been reserved for the codecs when the QoS reserved is greater than the QoS requirements of the codecs. For example, sufficient QoS is reserved when a reserved transmission rate is greater than the transmission rate requirements of one or more codecs.

If the communication is operating as an originating device of a communication session, the SDP message may include all the codecs for which QoS has been reserved. If the communication device is operating as a terminating device of the communication session, the SDP message may include only a single codec for which QoS has been reserved, e.g., the codec with the highest priority for which QoS has been reserved. In this manner, selection of codecs to include in the SDP message depends on the QoS reserved by the communication device.

If there are no codecs that have QoS requirements that are less than or equal to the reserved QoS, the communication device determines the QoS mode of device. If the communication device is operating in a QoS mode that requires reservation of sufficient QoS before a communication session can be established, the device aborts the session establishment. If the communication device is operating in a QoS mode that prefers sufficient QoS to be reserved, but operates using best-effort QoS when insufficient QoS is reserved, the device selects one or more of the codecs supported by the device and includes the selected codecs in an SDP message. As an example, the communication device may include all the codecs that are supported by the device when the device is operating as an originating device of the communication session, e.g., when the device is sending an SDP offer. In this manner, selection of codecs to include in the SDP message depends on the QoS configuration mode of the communication device.

The techniques of this disclosure thus provide for QoS aware communication session establishment. Moreover, the techniques may be utilized for applications running over various underlying technologies. For example, the same techniques may be used to establish communication sessions for a communication device running over a wireless local area network (WLAN) and a communication device operating over a 1xEvolution-Data Optimized (1x EV-DO) network. In this manner, the techniques operate as a single implementation that works over different access technologies.

FIG. 1 is a block diagram illustrating a system 10 for management of communication sessions between a wireless communication device (WCD) 14 and a communication device 16. System 10 includes a SIP network 12 that is embedded in or otherwise coupled to a packet-based communication network, such as an Internet Protocol (IP) network (not shown). In the example of FIG. 1, WCD 14 communicates with communication device 16 using a SIP session administered by SIP network 12. In many cases, WCD 14 may communicate with more than one communication device. For ease of illustration, however, FIG. 1 depicts communication between WCD 14 and communication device 16.

WCD 14 may be any wireless device, such as a cellular telephone, a satellite telephone, a radio telephone, a personal digital assistant (PDA), a so-called SIP phone, a soft phone, a WiFi handset, an IP phone or any other device incorporating wireless communication capabilities. Communication device 16 may be any device incorporating wired or wireless communication capabilities, such as another WCD, a desktop computer, a laptop computer, a fixed telephone, a media gateway, an application server or the like. In this disclosure, WCD 14 and communication device 16 may be configured to support SIP or other signaling protocols for Voice-over-Internet-Protocol (VoIP) audio conferencing, video conferencing, text messaging, online gaming, and other packet-based telephony applications.

WCD 14 is coupled to SIP network 12 via access network 18A. Communication device 16 is coupled to SIP network 12 via another access network 18B, which may be wired or wireless. WCD 14 and communication device 16 communicate via access network 18A and 18B, respectively, according to any of a variety of wireless radio access technologies (RATs) such as General Packet Radio Service (GPRS), Code Division Multiple Access (CDMA), CDMA 2000, Wideband-CDMA (W-CDMA), 1x Evolution-Data Optimized (1xEV-DO), or the like. WCD 14 and communication device 16 may communicate via access network 18A and 18B using the same access technology or using a different access technologies. Alternatively, or additionally, WCD 14 and communication device 16 may be equipped to communicate according to a wireless local area network (WLAN) protocol such as any of the protocols defined by the various IEEE 801.11x standards. Access networks 18 may include wireless base stations and access points that exchange wireless signals with WCD 14 and communication device 16, and provide a connection to other network clients or servers via a global packet-based core network such as the Internet, a wide area network (WAN), or a local area network (LAN), and/or the public switched telephone network (PSTN).

SIP network 12 includes proxy servers 20A and 20B (collectively "proxy servers 20") that act on behalf of WCD 14 and communication device 16 to facilitate the establishment of a session by exchanging SIP messages. WCD 14, communication device 16 and proxy servers 20 exchange SIP messages to create, maintain, and terminate a session between WCD 14 and communication device 16. Upon establishment of a SIP session, multimedia content such as audio, video or both may be exchanged between WCD 14 and communication device 16 in accordance with a media transport protocol such as real-time transport protocol (RTP).

When a user of an originating device, e.g., one of WCD 14 or communication device 16, interacts with an application executing on the device that requires a VoIP session to be established, the originating device communicates with proxy servers 20 to facilitate the establishment of a session between the originating device and a terminating device, e.g., the other one of WCD 14 and communication device 16. The phrase "originating device" as used in this disclosure, refers to the communication device that initiates the attempt to establish the session, e.g., make a call. The phrase "terminating device" as used in this disclosure, refers to the communication device with which the originating device is attempting to establish the VoIP session. WCD 14, communication device 16 and proxy servers 20 may exchange a number of SIP messages, such as INVITE requests, responses, and ACK requests to establish the session.

One or both of WCD 14 and communication device 16 may be configured to reserve QoS during establishment of the communication session in accordance with the techniques of this disclosure. For exemplary purposes, FIG. 1 will be described in terms of both WCD 14 and communication device 16 supporting the techniques of this disclosure. In other words, both the originating device and the terminating device of the session may support the techniques described herein. In other examples, however, only the originating device or only the terminating device supports the techniques.

In accordance with the techniques of this disclosure, WCD 14 and communication device 16 support at least two QoS configuration modes. The QoS configuration mode in which WCD 14 and communication device operates may depend on the service provider and/or the radio access technology of access networks 18 by which the devices access an IP-based infrastructure (not shown in FIG. 1). Based on the QoS mode in which WCD 14 and communication device 16 are operating, WCD 14 and communication device 16 negotiate during establishment of the VoIP session to determine a particular codec to use during the communication session.

As an example, WCD 14 and communication device 16 may each support two QoS configuration modes; a QoS required mode and a QoS preferred mode. WCD 14 and communication device 16 may operate in the same QoS configuration mode. On the other hand, WCD 14 and communication device 16 do not need to operate in the same QoS configuration modes to communicate with one another. For example, WCD 14 may operate in a QoS required mode and communicate with communication device 16, which may be operating in a QoS preferred mode.

When operating in the QoS required mode, sufficient QoS must be reserved in order to establish a communication session. To this end, during establishment of the communication session, WCD 14 and communication device 16 will only select codecs for which sufficient QoS can be reserved. In particular, WCD 14 and communication device 16 indicate in an SDP message, e.g., either an offer or answer, which codecs will be suitable for the desired QoS. WCD 14 and communication device 16 will not include codecs for which QoS cannot be reserved in the SDP messages.

When operating in the QoS preferred mode, WCD 14 and communication device 16 may attempt to reserve QoS for one or more supported codecs. If the reserved QoS (e.g., transmission rate and/or latency) is greater than the QoS transmission rate and latency requirements of the codecs then sufficient QoS is reserved for that particular codec. If WCD 14 determines that sufficient QoS is reserved for any of the codecs, WCD 14 and communication device 16 selects one or more of the codecs for which QoS has been reserved and lists the selected codecs in an SDP message. Failure of WCD 14 and communication device 16 to reserve sufficient QoS for any codecs, however, does not result in abandonment of the session establishment. Instead, the QoS preferred mode allows WCD 14 and communication device 16 to identify one or more supported codecs for which QoS has not been reserved in the SDP message, and thus operate using best-effort QoS. As used herein, the term "best-effort QoS" refers to a basic connectivity with no QoS guarantees. Therefore, reservation of QoS for codecs is preferred, but not required when operating in the QoS preferred mode.

WCD 14 and communication device 16 may select whether to operate in the QoS required mode or the QoS preferred mode. WCD 14 and communication device 16 may, for example, select the QoS mode based on the underlying radio access technology of a respective one of access networks 18. As an example, WCD 14 may select to operate in the QoS required mode when access network 18A is a 1xEV-DO network. Alternatively, WCD 14 may operate in either the QoS required mode or the QoS preferred mode when access network 18A is a WLAN. As another example, a service provider operating access networks 18 may specify the particular QoS mode that WCD 14 and communication device 16 in which must operate. As yet another example, a user operating WCD 14 or communication device 16 may select the QoS mode.

In the example of FIG. 1, SIP network 12 includes two proxy servers 20A and 20B, and two endpoint clients, i.e., WCD 14 and communication device 16. However, a SIP infrastructure may include any number of proxy servers, registrar servers, and location servers, as well as numerous endpoints. The QoS reservation techniques described in this disclosure may be executed by communication devices over any SIP infrastructure. Accordingly, SIP network 12 as shown in FIG. 1 is merely exemplary and should not be considered limiting of the techniques as broadly described in this disclosure.

Figure 2:
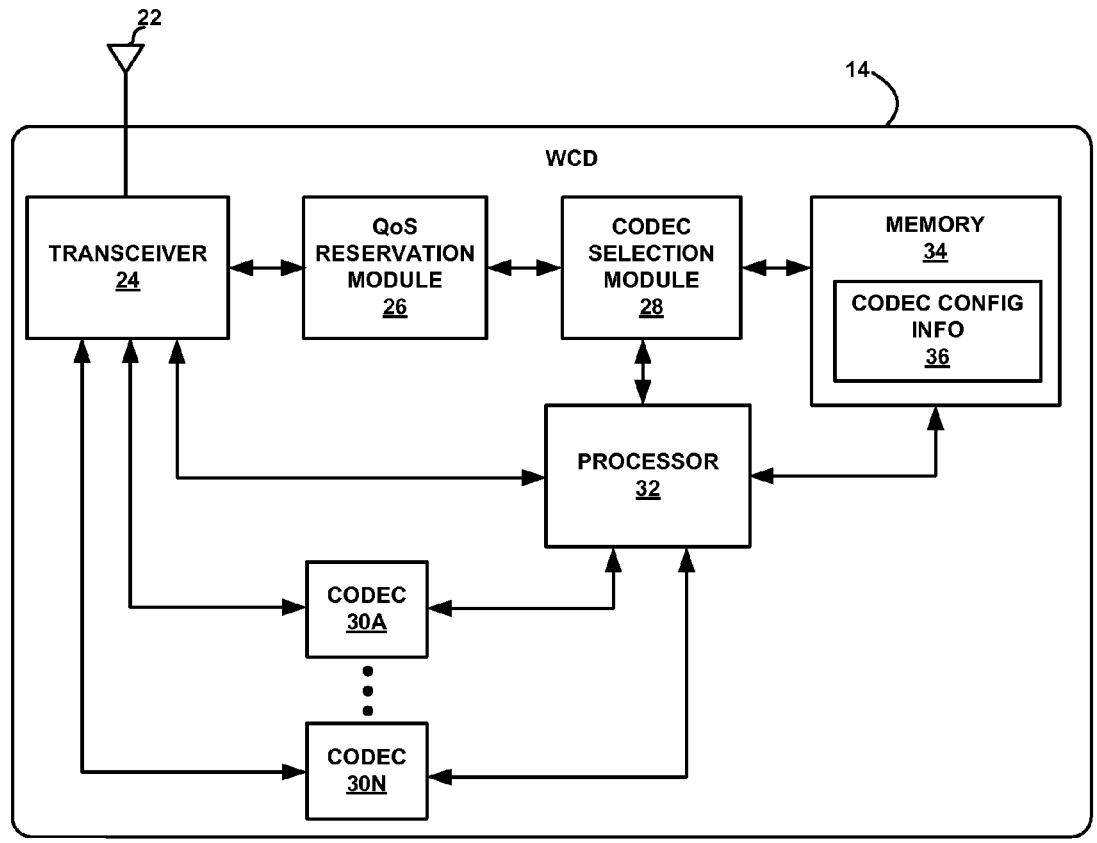
FIG. 2 is a block diagram illustrating example components of a WCD that performs QoS-aware session establishment in accordance with this disclosure.

FIG. 2 is a block diagram illustrating example components of a WCD, such as WCD 14 of FIG. 1, that performs QoS reservation techniques in accordance with this disclosure. WCD 14 includes an antenna 22, a wireless transceiver 24, a QoS reservation module 26, a codec selection module 28, coder-decoder (codec) modules 30A-30N (collectively "codecs 30"), a processor 32, and a memory 34.

Transceiver 24 transmits and receives wireless signals via antenna 22. Transceiver 24 may include appropriate analog and/or digital circuit components such as, for example, amplifiers, filters, frequency converters, modulators, demodulators, analog-to-digital conversion circuitry, digital-to-analog conversion circuitry, and digital modem circuitry. In operation, antenna 22 transmits and receives wireless signals on radio frequency bands supported by WCD 14. Transceiver 24 may be configured to support any desired radio access technology (RAT) or any WLAN protocol.

Processor 32 controls transceiver 24 to transmit wireless signals and processes signals received by transceiver 24. Processor 32 may be responsible for setting up, modifying, and terminating communication sessions, e.g., by exchanging signaling protocol messages, with other devices in accordance with SIP or other signaling protocol. In particular, processor 32 may execute user agent client (UAC) and/or user agent server (UAS) processes to generate SIP requests and responses. As an example, processor 32 may execute UAC processes to generate SIP requests and send the requests to another device of SIP network 12 (FIG. 1). Thus, processor 32 may execute UAC processes to function as an originating device of a communication session. Processor 32 may execute UAS processes to process received SIP requests and respond to the SIP requests. Thus, processor 32 may execute UAS processes to function as a terminating device of a communication session. In this manner, UAC and UAS processes act as logical entities for sending and receiving, respectively, SIP messages.

WCD 14 is configured to support a number of codecs 30. Codecs 30 may, for example, include a 4GV Wideband Codec, a 4GV Narrowband Codec, an Enhanced Variable Rate Codec (EVRC), a G.729 Codec, a G.711 Codec, as well as any number of other types of codecs. WCD 14 may be configured to use different ones of codecs 30 based on different radio access technologies implemented in access network 18A (FIG. 1). As an example, WCD 14 may be configured to use one of the 4GV Wideband Codec, the 4GV Narrowband Codec, or the EVRC when operating within a 1xEV-DO network. As another example, WCD 14 may be configured to use one of the 4GV Wideband Codec, the 4GV Narrowband Codec, the EVRC, the G.729 Codec, or the G.711 Codec when operating within a WLAN.

WCD 14 stores codec configuration information 36 within memory 34. Codec configuration information 36 describes characteristics of each of codecs 30. As an example, codec configuration information 36 may describe a maximum encoding data rate, i.e., rate at which data is output by the codec, requirement for each of codecs 30, a maximum tolerable delay requirement for each of codecs 30, a QoS level associated with each of codecs 30, a priority associated with each of codecs 30, a name associated with each of codecs 30 and the like.

The QoS level associated with each of codecs 30 may be determined based on the maximum encoding data rate and the maximum tolerable delay requirements of codecs 30. In this manner, a QoS level associated with codecs 30 is determined based on the QoS requirements of the particular codec. For example, the EVRC codec may be assigned to QoS level 1 since its rate is 9.6 kbps. G.711, on the other hand, may be assigned to QoS level 2 since its rate is much higher, e.g., 64 kbps. This may be so even though both the EVRC and the G.711 have the same latency requirements. The precise definition of QoS level depends on the access technology over which VoIP is deployed. In the case of deploying VoIP in a 1xEV-DO network, the QoS levels equate to a flow profile identifier (ProfileID) associated with codecs 30. As an example, only a single QoS level, i.e., Level 1, is defined for deployment over the 1xEV-DO network. Codecs associated with QoS Level 1 for a 1xEV-DO network may include the 4GV Wideband Codec, the 4GV Narrowband Codec, and the EVRC. In the case of deploying VoIP in a WLAN network, more than one QoS level is defined. As an example, each of codecs 30 may be associated with one of two QoS levels, i.e., Level 1 and Level 2. WLAN QoS Level 1 may include the 4GV Wideband Codec, the 4GV Narrowband Codec, the EVRC and the G.729 Codec. WLAN QoS Level 2 may include the G.711 Codec. Although the examples discussed herein are discussed in the context of two levels of QoS, the techniques of this disclosure may be used in implementations with any number of levels of QoS.

The priority associated with each of codecs 30 may also depend on the access technology over which VoIP is deployed. In other words, the priority associated with each of codecs 30 may vary when VoIP is deployed over 1xEV-DO network as opposed to WLAN. The priority associated with each of codecs 30 may be determined by the service provider of the access network 18 and/or the core network (FIG. 1). As an example, the service provider may identify one or more codecs that it prefers WCD 14 to use. WCD 14 may assign arbitrary priority values to codecs 30 that are not assigned a priority by the service provider.

As described above, WCD 14 may be configured to support multiple QoS modes, such as a QoS required mode and a QoS preferred mode. When operating in the QoS required mode, QoS reservation module 26 must reserve sufficient QoS for at least one of codecs 30 in order to establish a communication session. When operating in the QoS preferred mode, QoS reservation module 26 may attempt to reserve QoS for one or more of codecs 30, but operate using best-effort QoS when QoS reservation module 26 is unable to reserve sufficient QoS for any of codecs 30. As described above, WCD 14 may select the QoS mode based on the underlying technology of a respective one of access networks 18 (FIG. 1), based on a service providers requirement, or based on input from a user of WCD 14.

In either mode, QoS reservation module 26 attempts to reserve QoS for one or more of codecs 30 using a QoS reservation procedure corresponding to the access technology. QoS reservation module 26 may attempt to reserve QoS for each of the QoS levels associated a particular underlying technology. In this manner, when QoS reservation module 26 reserves QoS for a level, it has reserved QoS for each of codecs 30 associated with the corresponding QoS level. Moreover, when QoS is reserved for a particular level, one or more codecs associated with lower levels may be supported at the higher level. QoS reservation module 26 may attempt QoS reservation for the QoS levels in descending order. When deploying VoIP over WLAN, for example, QoS reservation module 26 attempts to reserve QoS for QoS Level 2 first, and attempts to reserve QoS for QoS Level 1 only after failure to reserve QoS for QoS Level 2. As described above, the techniques may be utilized in implementations with more QoS levels.

Codec selection module 28 selects one or more of codecs 30 that may be used during the communication session based on the QoS mode in which WCD 14 is operating. When WCD 14 is operating as an originating device, for example, codec selection module 28 selects one or more of codecs 30 to include in an SDP offer of an INVITE request. In particular, codec selection module 28 retrieves codec configuration information 36 from memory 34, and generates a list of codecs 30 based on priorities associated with codecs 30. In particular, codec selection module 28 arranges the list of codecs 30 in a descending order of priority from the codec with the highest priority to the codec with the lowest priority.

Codec selection module 28 compares QoS levels associated with codecs 30 of the list to the QoS level reserved by QoS reservation module 26, and removes all codecs 30 that have associated QoS levels that are greater than the QoS level reserved by QoS reservation module 26 from the list of codecs. If QoS reservation module 26 reserves, for example, QoS Level 1, codec selection module 28 removes all QoS Level 2 codecs from the list of available codecs. Codec selection module 28 sends the list of codecs that have QoS levels below the reserved QoS level to processor 32. Processor 32 generates an SDP offer that includes the list of available codecs, and sends the SDP offer as the body of an INVITE request.

If there are no codecs 30 that have QoS levels less than or equal to the reserved QoS level, e.g., if no level of QoS is reserved, codec selection module 28 determines the QoS mode of WCD 14. If codec selection module 28 determines that WCD 14 is operating in the QoS required mode, processor 32 aborts the session establishment before an INVITE request is sent to the terminating device. If codec selection module 28 determines that WCD 14 is operating in the QoS preferred mode, processor 32 generates an SDP offer that includes all configured codecs supported by WCD 14 in the offer. In this manner, selection of codecs to include in the SDP offer depends on the QoS configuration mode of the communication device.

A similar codec selection technique is utilized to select one or more codecs from an SDP offer to include in an SDP answer when WCD 14 is operating as a terminating device in the session establishment. In particular, codec selection module 28 compares the codecs included in the SDP offer with the codecs supported by WCD 14, and generates a list of codecs that are both supported by WCD 14 and in the list of offered codecs from an originating device, referred to herein as "matching codecs." If WCD 14 does not support any codecs that are included in the offer, processor 32 generates and sends a message to the originating device that indicates that WCD 14 is unable to adequately support the session as described. As an example, processor 32 may generate and send a SIP 488 response ("not acceptable here").

If there are codecs that are both listed in the offer and supported by WCD 14 (i.e., matching codecs), QoS reservation module 26 attempts to reserve QoS for one or more of codecs 30, as described in detail above. Codec selection module 28 compares QoS levels associated with the matching codecs to the QoS level reserved by QoS reservation module 26. Codec selection module 28 may, for example, compare the QoS levels associated with the matching codecs to the QoS level reserved by QoS reservation module 26 in an order based on priority. In other words, codec selection module 28 may compare the QoS level of the matching codec with the highest priority with the reserved QoS level, and select that codec for inclusion into the SDP answer if the QoS level of the matching codec is less than or equal to the reserved QoS level. If that codec has a higher QoS level than the reserved QoS level, codec selection module 28 compares the codec with the next highest priority. Codec selection module 28 continues to compare QoS levels of matching codecs until one is found that has a QoS level less than or equal to the reserved QoS level. Processor 32 includes the first one of the matching codecs that has a QoS level that is less than or equal to the reserved QoS level in the SDP answer. Alternatively, codec selection module 28 may compare the QoS level of all the matching codecs and select more than one codec to be included in the SDP answer.

If there are no matching codecs that have QoS levels less than or equal to the reserved QoS level, codec selection module 28 determines the QoS mode of WCD 14. If codec selection module 28 determines that WCD 14 is operating in the QoS required mode, processor 32 aborts the session establishment. For example, processor 32 may reject the INVITE with a 488 response. If codec selection module 28 determines that WCD 14 is operating in the QoS preferred mode, processor 32 generates an SDP answer that includes the matching codec with the highest priority.

After a communication session has been negotiated, QoS reservation module 26 determines whether adjustment to the QoS reservation is necessary. QoS reservation module 26 may, for example, need to adjust the QoS reservation when there is either an overprovisioning or underprovisioning of reserved QoS. In the case of overprovisioning, the QoS level reserved is higher than the QoS level associated with the selected codec, and QoS reservation module 26 may reserve a lower QoS level. In the case of underprovisioning, the level of QoS reserved by QoS reservation module 26 is insufficient for the QoS level required by the codec in use, and QoS reservation module 26 may release the reserved QoS.

The various components illustrated in FIG. 2 may be realized in hardware, software, firmware, or any combination thereof. Some components may be realized as processes or modules executed by one or more microprocessors or digital signal processors (DSPs), one or more application specific integrated circuits (ASICs), one or more field programmable gate arrays (FPGAs), or other equivalent integrated or discrete logic circuitry. Depiction of different features as modules is intended to highlight different functional aspects of WCD 14 and does not necessarily imply that such modules must be realized by separate hardware and/or software components. Rather, functionality associated with one or more modules may be integrated within common or separate hardware and/or software components. Thus, the disclosure should not be limited to the example of WCD 14.

When implemented in software, the functionality ascribed to the systems and devices described in this disclosure may be embodied as instructions on a computer-readable medium, such as within memory 34, which may comprise, for example, random access memory (RAM), read-only memory (ROM), non-volatile random access memory (NVRAM), electrically erasable programmable read-only memory (EEPROM), FLASH memory, magnetic or optical data storage media, or the like. The instructions are executed to support one or more aspects of the functionality described in this disclosure.

Figure 3:
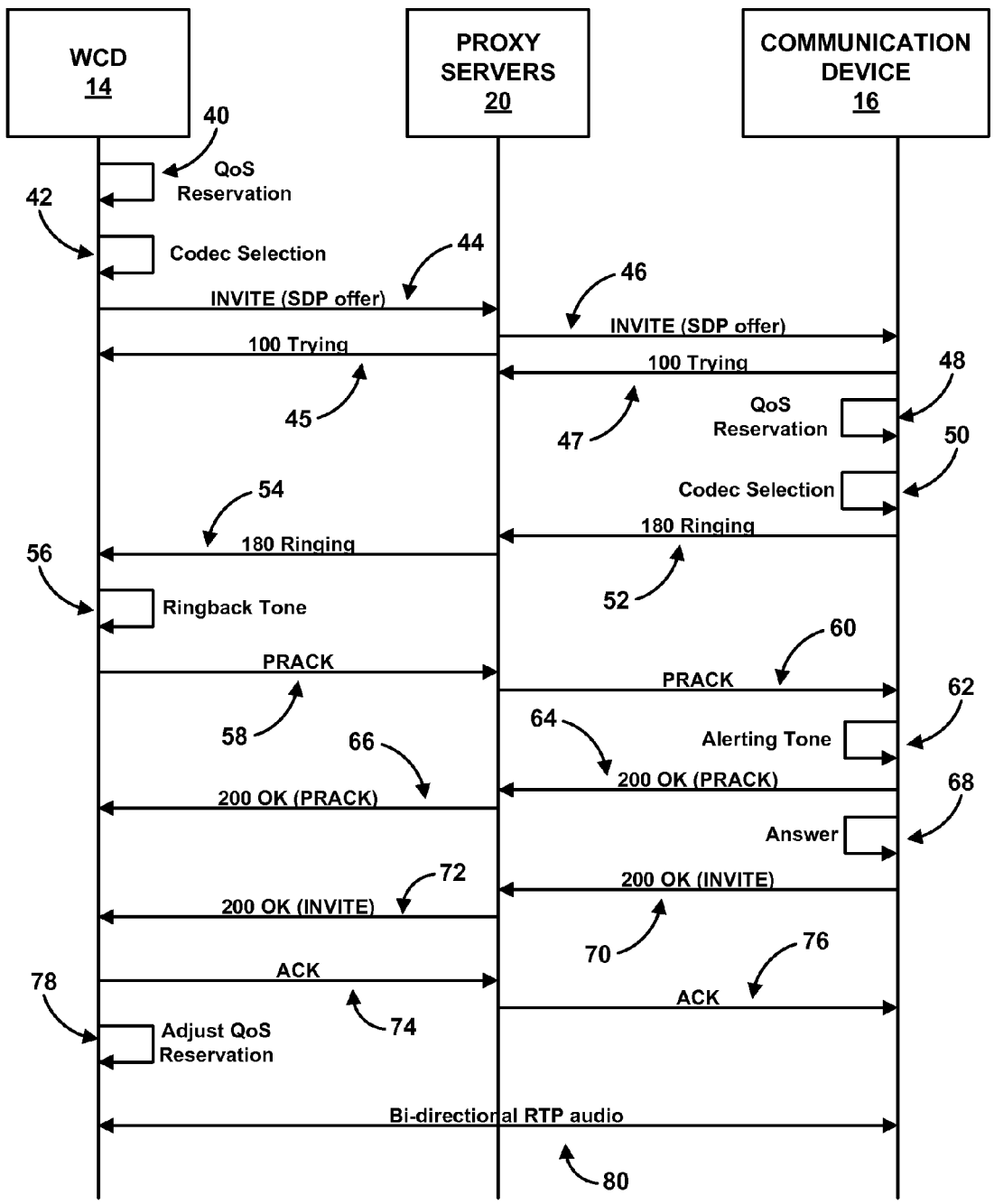
FIG. 3 is a call flow diagram illustrating an exemplary exchange of call control messages to establish a communication session between two communication devices.

FIG. 3 is a call flow diagram illustrating an exemplary exchange of call control messages, such as SIP messages, to establish a communication session between WCD 14 and communication device 16. In the example illustrated in FIG. 3, WCD 14 is an originating device of the session and communication device 16 is a terminating device of the session. The communication session established between WCD 14 and communication device 16 may, for example, be a VoIP session. In the example illustrated in FIG. 3, WCD 14 and communication device 16 each select codecs for use in the communication session in accordance with the techniques of this disclosure.

Initially, a user of WCD 14 interacts with an application executing on the device that requires a VoIP session to be established. In response, WCD 14 attempts to reserve QoS for one or more of codecs 30 (40). As an example, QoS reservation module 26 may attempt to reserve QoS for each of the QoS levels associated with a particular underlying access technology. QoS reservation module 26 may attempt QoS reservation in descending order of QoS levels.

Additionally, WCD 14 selects one or more codecs to be included in an SDP offer based on a QoS mode of WCD 14 (42). As described in detail above, WCD 14 selects codecs for which QoS has been reserved. If it is not possible to reserve resources for any codec 30 supported by WCD 14, WCD 14 determines the QoS mode of WCD 14. When WCD 14 is operating in the QoS required mode, WCD 14 aborts the session establishment before sending an INVITE message. When WCD 14 is operating in the QoS preferred mode, however, WCD 14 selects all codecs supported by WCD 14 to include in the SDP offer, and thus operates using best-effort QoS.

WCD 14 constructs an INVITE request that includes the SDP offer that identifies the selected codecs, and sends the INVITE request to proxy servers 20 (44). The INVITE request may include other information required to conform to the call control protocol, such as other SIP headers. Proxy servers 20 are grouped into a single block for ease of illustration. The proxy server block, however, represents a number of proxy servers and other SIP devices that facilitate the establishment of a session by exchanging SIP messages with one another, WCD 14 and communication device 16.

The one of proxy servers 20 associated with WCD 14, e.g., proxy server 20A in FIG. 1, sends a 100 Trying response to WCD 14 upon receiving the INVITE request (45). Proxy servers 20 process the INVITE request and ultimately route the invite request to communication device 16 via the one of proxy servers 20 associated with communication device 16, e.g., proxy server 20B (FIG. 1) (46).

Communication device 16 sends a 100 Trying response to suppress retransmissions of the INVITE by proxy servers 20 (47). Communication device 16 attempts to reserve QoS for one or more of matching codecs (48). As described above, communication device 16 selects one or more of the codecs listed in the SDP offer to include in an SDP answer based on the QoS mode of communication device 16 (50). Communication device selects the most preferred codec of the communication device 16 present in the SDP offer and for whom QoS is reserved. If QoS cannot be reserved for any offered codec, communication device 16 either sends an appropriate failure response if communication device 16 is operating in the QoS required mode or selects the most preferred codec in the offer if communication device 16 is operating in the QoS preferred mode.

Communication device 16 constructs an SDP answer that includes the one or more selected codecs, and sends a 180 Ringing response that includes the SDP answer (52). Proxy servers 20 process the 180 Ringing response and routes it to WCD 14 via the one of proxy servers 20 associated with WCD 14 (54). The 180 Ringing establishes an early dialog at WCD 14.

WCD 14 inspects the SDP answer body. WCD 14 may stop listening on codecs that are not included in the SDP answer body. WCD 14 confirms that resource reservation is complete at called party end. As an example, the SDP answer may indicate that all of the preconditions necessary to establish the session have been met. Therefore, WCD 14 plays a ringback tone locally (56). WCD 14 sends a PRACK request to acknowledge the receipt of the reliable 180 Ringing (58). The PRACK request shall typically not include a message body. Proxy servers 20 forward the PRACK request to communication device 16 (60).

Communication device 16 checks that the PRACK matches an unacknowledged reliable provisional response (in this case 180 Ringing). Communication device 16 generates an alerting tone to alert the called party of the incoming call (62). Since the PRACK matched a reliable provisional response, communication device 16 responds with a 200 OK (64). The 200 OK response is forwarded by proxy servers 20 to WCD 14 (66).

The called party answers communication device 16 (68). When the called party answers, communication device 16 sends a 200 OK final response for the INVITE transaction (70). Proxy servers 20 forward the 200 OK response to WCD 14 (72). The 200 OK establishes a confirmed dialog between WCD 14 and communication device 16. WCD 14 sends ACK request to acknowledge the 200 OK (74). Proxy servers 20 forward the ACK to communication device 16 (76).

If required, WCD 14 may adjust the QoS reservation (78). If QoS reservation is in excess of what is required for the codec specified in the SDP answer, WCD 14 may release the excess portion of the QoS reservation. If QoS reserved is less than that required for the codec specified in the SDP answer, which may occur in the QoS preferred mode, WCD 14 may release the entire reserved QoS since it is insufficient for the codec being used. WCD 14 may release reserved QoS once dialog is confirmed. WCD 14 may, however, choose to release reserved QoS earlier.

A SIP session is now established between WCD 14 and communication device 16. The SIP session continues until either party hangs-up. WCD 14 and communication device 16 exchange bidirectional RTP multimedia using the negotiated codec (80).

Figure 4:
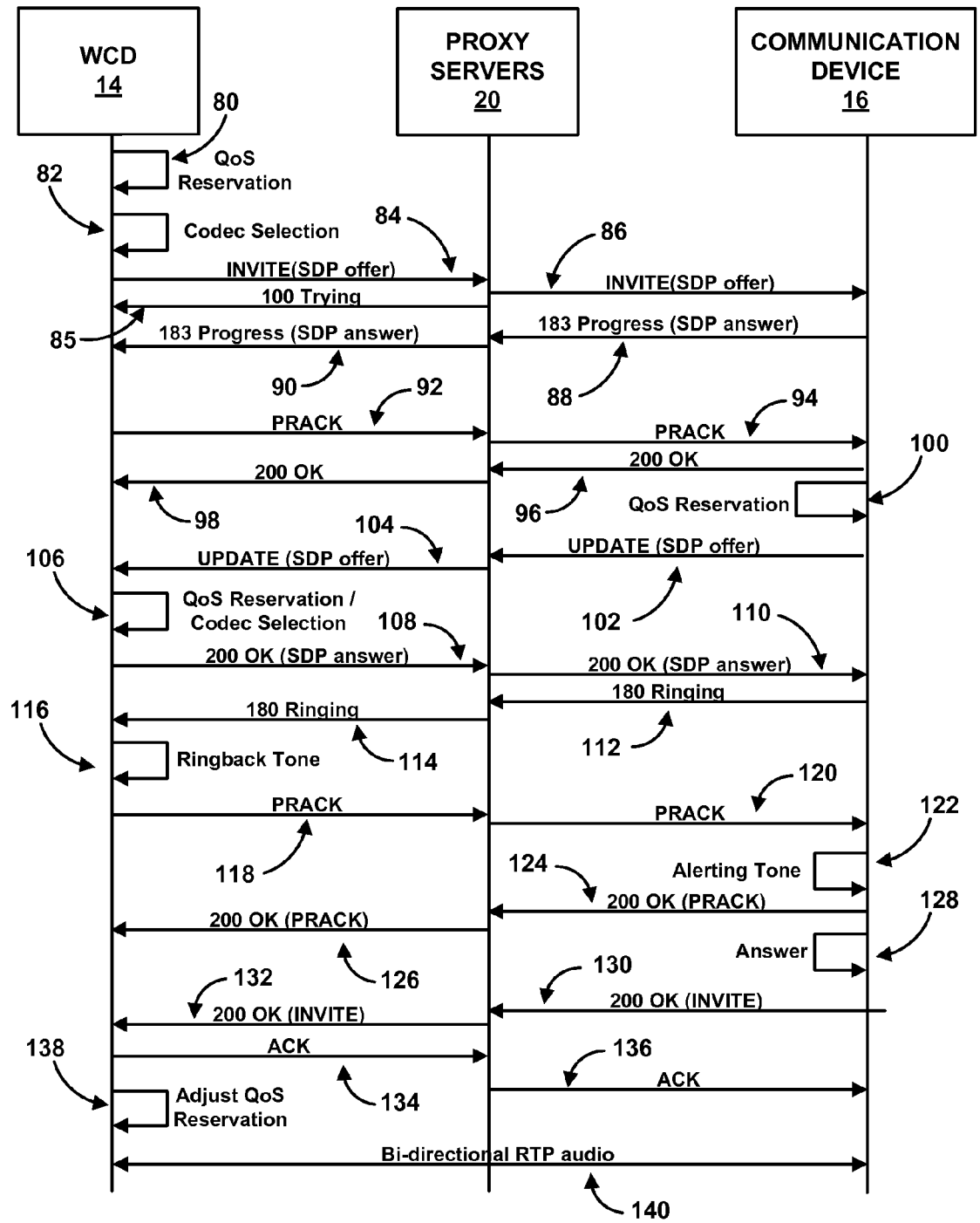
FIG. 4 is a call flow diagram illustrating another exemplary exchange of call control messages for establishing a communication session between two communication devices.

FIG. 4 is a call flow diagram illustrating another exemplary exchange of call control messages, such as SIP messages, for establishing a communication session between WCD 14 and communication device 16. The flow diagram illustrated in FIG. 4 conforms substantially to the flow diagram of FIG. 3, but in the flow diagram of FIG. 4 only WCD 14 selects codecs for use in the communication session in accordance with the techniques of this disclosure.

Initially, a user of WCD 14 interacts with an application executing on the device that requires a VoIP session to be established. In response, WCD 14 attempts to reserve QoS for one or more of codecs 30 (80) and selects one or more codecs to be included in an SDP offer based on a QoS mode of WCD 14 (82). As described in detail above, WCD 14 selects codecs for which QoS has been reserved. If it is not possible to reserve resources for any codec 30 supported by WCD 14, WCD 14 determines the QoS mode of WCD 14. When WCD 14 is operating in the QoS required mode, WCD 14 aborts the session establishment before sending an INVITE message. When WCD 14 is operating in the QoS preferred mode, however, WCD 14 selects to include all codecs supported by WCD 14 in the SDP offer, and thus operate using best-effort QoS.

WCD 14 constructs an INVITE request that includes an SDP offer that identifies a list of selected codecs, and sends the INVITE request to proxy servers 20 (84). Proxy servers 20 send a 100 Trying response to WCD 14 upon receiving the INVITE request (85), and forward the INVITE request on to communication device 16 (86).

Communication device 16 generates and sends a provisional response, e.g., a 183 Progress provisional response (88). Communication device 16 cannot send a 180 response because the 180 response causes ringing before the QoS is reserved, which could subsequently cause the session to be established before resource reservation is complete. This would lead to a bad user experience. The provisional response includes an SDP answer that indicates that the preconditions of the session are not met, including the reservation of the necessary QoS. In other words, communication device 16 has not yet reserved the necessary QoS. The SDP answer does, however, include one or more codecs supported by communication device 16. Proxy servers 20 forward the 183 Progress response on to WCD 14 (90).

WCD 14 inspects the SDP answer body, and begins to listen on the most preferred codec included in the SDP answer. Additionally, WCD 14 determines from the SDP answer that the preconditions necessary to establish the session with sufficient QoS reserved have not yet been met at communication device 16.

WCD 14 sends a PRACK request to acknowledge the receipt of the reliable 183 Progress (92). Proxy servers 20 forward the PRACK request to communication device 16 (94). Communication device 16 checks that the PRACK matches an unacknowledged reliable provisional response (in this case 183 Progress). Since the PRACK matched a reliable provisional response, communication device 16 responds with a 200 OK (96). Proxy servers forward the 200 OK response to WCD 14 (98).

Communication device 16 completes QoS reservation (100). Communication device 16 may have started the QoS reservation at any time after the INVITE is received. In the example illustrated in FIG. 4, communication device 16 modifies an aspect of the session, such as making a codec change or a changing the status of the QoS reservation. Communication device 16 constructs an UPDATE request including a new SDP offer, and sends the UPDATE request (102). Proxy servers 20 forward the UPDATE request on to WCD 14 (104). WCD 14 processes the UPDATE request as a mid-dialog target refresh request. In particular, WCD 14 selects one or more codecs to include in the SDP answer (106). WCD 14 first determines whether the codec selected based on the previous offer-answer exchange (e.g., at step 80) is included within the list of offered codecs. If the codec selected based on the previous offer-answer exchange is included within the list of offered codecs, WCD 14 selects the previously selected codec. If the codec selected based on the previous offer-answer exchange is not included within the list of offered codecs, WCD 14 creates a list of matching codecs that is sorted in order of priority. WCD 14 attempts to select a codec based on the previously made QoS reservation (e.g., at step 80). If one of the codecs included in the new offer has a QoS level less than or equal to the previously reserved QoS level, WCD 14 selects that codec. WCD 14 attempts a new QoS reservation only after it determines there are one or more codecs for which sufficient QoS had not been previously reserved. WCD 14 then selects a codec based on the newly reserved QoS. In this manner, WCD 14 only performs a new QoS reservation when the previous QoS reservation was insufficient.

WCD 14 generates a 200 OK response that includes the SDP answer identifying the selected codec, and sends the 200 OK response to proxy servers 20 (108). Proxy servers 20 forward the 200 OK response to the communication device 16 (110). Communication device 16 does not have to modify any aspect of the session. As such, steps 102-110 are only performed in situations in which modification to the session is desired.

Since communication device 16 satisfies the preconditions at this point, communication device 16 sends a 180 Ringing to WCD 14 (112). Proxy servers 20 forward the 180 Ringing response on to WCD 14 (114). WCD 14 plays a ringback tone locally (116). If WCD 14 has received a customized ringback tone from the network, it plays the received tone instead of local ringing. WCD 14 then sends a PRACK request to acknowledge the receipt of the reliable 180 Ringing (118). Proxy servers 20 forward the PRACK request to communication device 16 (120).

Communication device 16 checks that the PRACK matches an unacknowledged reliable provisional response (in this case 180 Ringing), and responds with a 200 OK (124). The 200 OK response is forwarded by proxy servers 20 to WCD 14 (126). Additionally, the called party, e.g., the user of communication device 16 is alerted to the incoming call using an alerting tone (122).

The called party answers communication device 16 (128). Communication device 16 sends a 200 OK final response for the INVITE transaction when the called party answers (130). Proxy servers 20 forward the 200 OK response to WCD 14 (132). The 200 OK establishes a confirmed dialog between WCD 14 and communication device 16. WCD 14 sends ACK request to acknowledge the 200 OK (134). Proxy servers 20 forward the ACK to communication device 16 (136).

If required, WCD 14 may release unneeded QoS reservation (138). A SIP session is now established between WCD 14 and communication device 16. The SIP session continues until either party hangs-up. WCD 14 and communication device 16 exchange bidirectional RTP multimedia using the negotiated codec (140).

Figure 5:
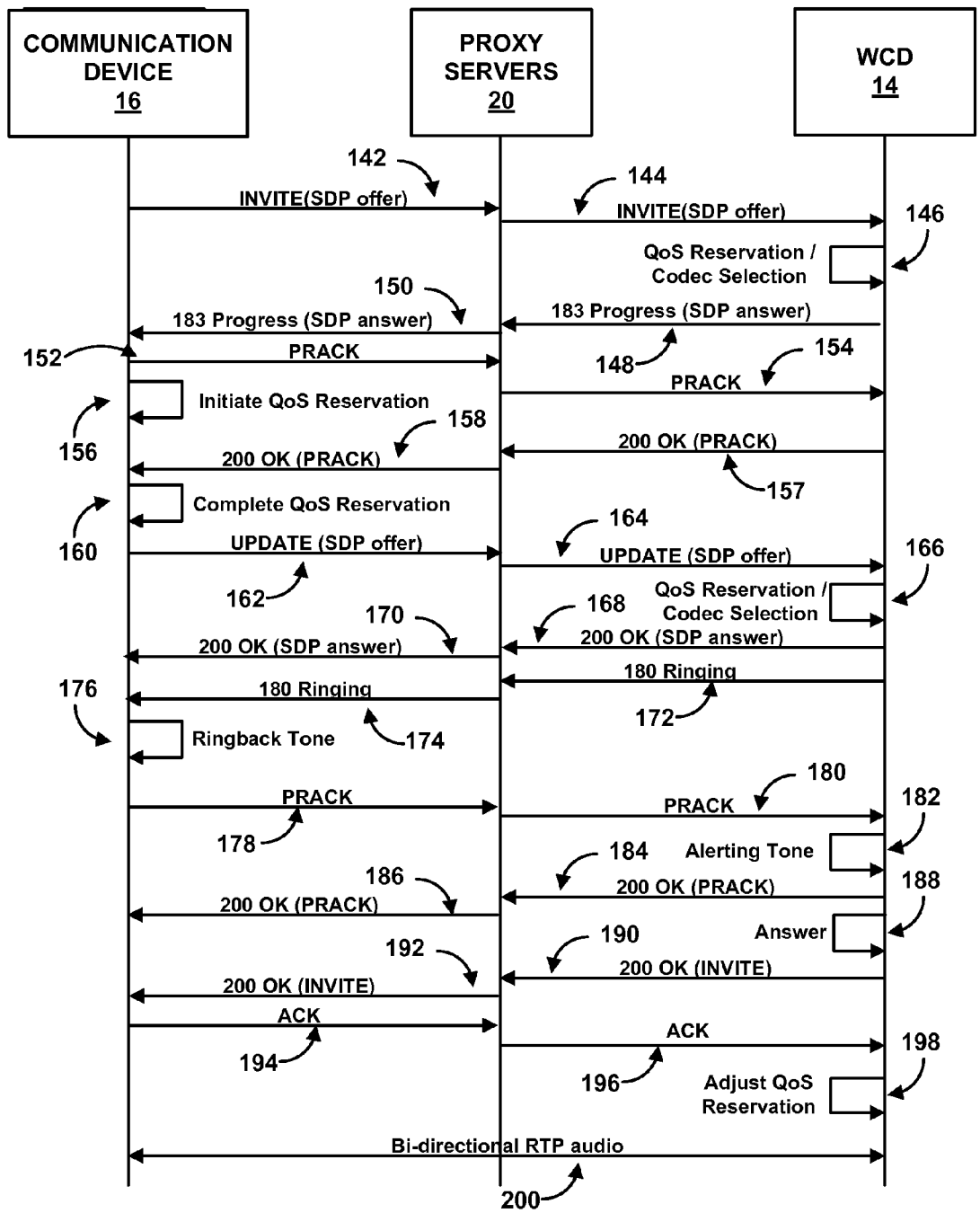
FIG. 5 is a call flow diagram illustrating yet another exemplary exchange of call control messages to establish a communication session between two communication devices.

FIG. 5 is a call flow diagram illustrating yet another exemplary exchange of call control messages to establish a communication session between WCD 14 and communication device 16. In the example illustrated in FIG. 3, the originating device, i.e., communication device 16, does not reserve QoS and select codecs in accordance with the techniques of the invention. The terminating device, i.e., WCD 14, does, however, reserve QoS and select codecs for use in the communication session in accordance with the techniques of this disclosure.

Communication device 16 generates and sends an INVITE request that includes an SDP offer in response to interaction from a user of communication device 16 that initiates a VoIP session (142). The SDP offer includes a list of proposed codecs supported by communication device 16 as well as preconditions that need to be met to establish the session. Proxy servers 20 forward the INVITE request on to WCD 14 (144).

WCD 14 attempts to reserve QoS for one or more of codecs that are in the list and supported by WCD 14, i.e., matching codecs. Additionally, WCD 14 selects one or more of the codecs listed in the SDP offer to include in an SDP answer based on the QoS mode of WCD 14 (146). In particular, WCD 14 selects the most preferred codec of the communication device 16 present in the SDP offer and for whom QoS is reserved. If QoS cannot be reserved for any offered codec, WCD 14 either sends an appropriate failure response if WCD 14 is operating in the QoS required mode or selects the most preferred codec in the offer if WCD 14 is operating in the QoS preferred mode.

WCD 14 constructs a 183 Progress response that includes an SDP answer specifying the codec selected by WCD 14, and sends the 183 Progress response (148). Proxy servers 20 forward the 183 Progress response to communication device 16 (150). Communication device sends PRACK request acknowledging the receipt of the 183 Progress response (152). Communication device 16 now knows that WCD 14 has accepted the SDP offer, and initiates QoS reservation for the codec selected through the first offer-answer exchange (156). Communication device 16 may initiate the QoS reservation for the codec simultaneously with sending the PRACK request.

Proxy servers 20 forward the PRACK request on to WCD 14 (154). WCD 14 checks that the PRACK matches an unacknowledged reliable provisional response (in this case 183 Progress), and responds with a 200 OK (157). Proxy servers 20 forward the 200 OK to the originating communication device 16 (158).

Communication device 16 receives information that the QoS reservation is now complete and thus that the local preconditions are met (160). Communication device 16 send an UPDATE message with a new SDP offer indicating that the local preconditions have been met (162). Proxy servers 20 forward the UPDATE request to WCD 14 (164).

WCD 14 completes codec selection and QoS reservation in response to the new SDP offer (166). As described in detail herein, WCD 14 first determines whether the codec selected based on the previous offer-answer exchange (e.g., at step 146) is included within the list of offered codecs. If the codec selected based on the previous offer-answer exchange is included within the list of offered codecs, WCD 14 selects the previously selected codec. If the codec selected based on the previous offer-answer exchange is not included within the list of offered codecs, WCD 14 creates a list of matching codecs that is sorted in order of priority. WCD 14 attempts to select a codec based on the previously made QoS reservation (e.g., at step 146). If one of the codecs included in the new offer has a QoS level less than or equal to the previously reserved QoS level, WCD 14 selects that codec. WCD 14 attempts a new QoS reservation only after it determines there are one or more codecs for which sufficient QoS had not been previously reserved. WCD 14 then selects a codec based on the newly reserved QoS. In this manner, WCD 14 only performs a new QoS reservation when the previous QoS reservation was insufficient. WCD 14 sends a 200 OK response that includes an SDP answer indicating the selected codec (168). Proxy servers 20 forward the 200 OK that includes the SDP answer to communication device 16 (170).

Anytime after WCD 14 has determined that both WCD 14 and communication device 16 have satisfied the preconditions, WCD 14 sends a 180 Ringing response (172). Proxy servers 20 forward the 180 Ringing response to communication device 16 (174). Communication device 16 plays a ringback tone locally (176).

Communication device 16 then sends a PRACK request to acknowledge the receipt of the reliable 180 Ringing (178). Proxy servers 20 forward the PRACK request to WCD 14 (180). WCD 14 checks that the PRACK matches an unacknowledged reliable provisional response (in this case 180 Ringing), and responds with a 200 OK (184). The 200 OK response is forwarded by proxy servers 20 to communication device 16 (186). WCD 14 generates an alerting tone to alert the called party of the incoming call (182).

The called party answers WCD 14 (188). WCD 14 sends a 200 OK final response for the INVITE transaction when the called party answers (190). Proxy servers 20 forward the 200 OK response to communication device 16 (192). The 200 OK establishes a confirmed dialog between WCD 14 and communication device 16. Communication device 16 sends ACK request to acknowledge the 200 OK (194). Proxy servers 20 forward the ACK to WCD 14 (196).

If required, WCD 14 may release unneeded QoS reservation (198). A SIP session is now established between WCD 14 and communication device 16. The SIP session continues until either party hangs-up. WCD 14 and communication device 16 exchange bidirectional RTP multimedia using the negotiated codec (200).

Figure 6:
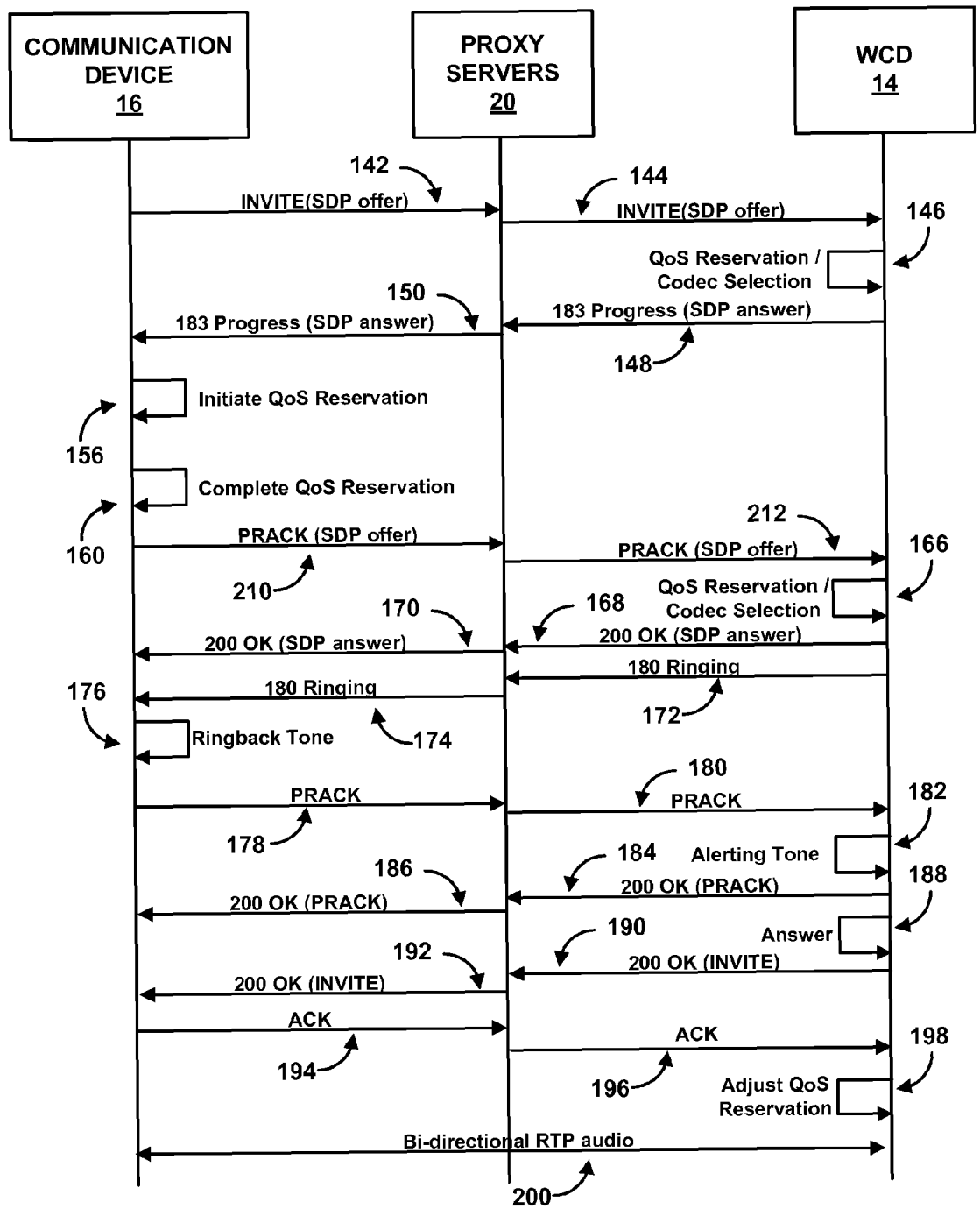
FIG. 6 is a call flow diagram illustrating a further exemplary exchange of call control messages to establish a communication session between two communication devices.

FIG. 6 is a call flow diagram illustrating a further exemplary exchange of call control messages to establish a communication session between WCD 14 and communication device 16. The call flow diagram of FIG. 6 conforms substantially to the call flow diagram of FIG. 5, but in the call flow diagram of FIG. 6 communication device 16 completes its QoS reservation before sending a new SDP offer. In particular, communication device 16 sends the new SDP offer in a PRACK request to the 183 Progress response (210, 212) instead of sending a PRACK request before completion of QoS reservation, and then sending an UPDATE message with the new SDP offer as in the call flow diagram of FIG. 5.

Figure 7:
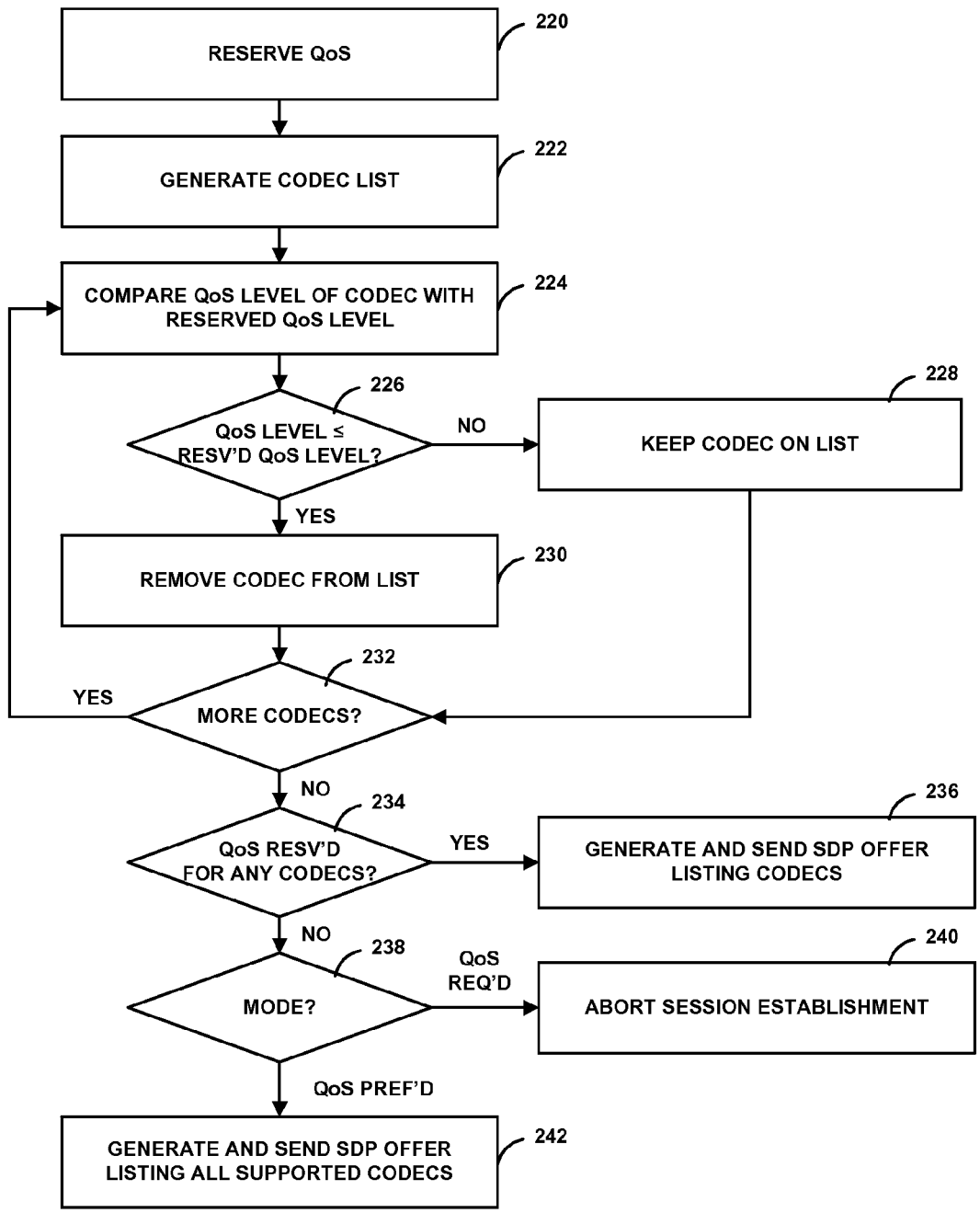
FIG. 7 is a flow diagram illustrating exemplary operation of a communication device selecting a set of one or more codecs to include in an SDP offer based on a QoS configuration mode of the communication device that originates the session.

FIG. 7 is a flow diagram illustrating exemplary operation of a communication device, such as WCD 14 of FIG. 2, selecting a set of one or more codecs 30 to include in an SDP offer based on a QoS configuration mode of WCD 14. In this case, WCD 14 is operating as an originating device in the SIP session. Initially, WCD 14 attempts to reserve QoS for one or more codecs (220). WCD 14 may, for example, attempt to reserve QoS for one or more QoS levels associated with the codecs in descending order of the QoS levels. When deploying VoIP over WLAN, for example, WCD 14 may attempt to reserve QoS for QoS level 2 first, and attempt to reserve QoS for QoS level 1 only after failure to reserve QoS for QoS level 2. WCD 14 may define any number of QoS levels. Two QoS levels are described, however, for exemplary purposes.

WCD 14 retrieves codec configuration information 36 from memory 34, and generates a list of codecs 30 that supported by WCD 14 and suitable for use in communication over the underlying access technology (222). WCD 14 may arrange the list of codecs 30 based on a priority associated with codecs 30, e.g., in a descending order based on a priority. As described above, the priority associated with each of codecs 30 may be assigned based on a particular service provider's preference.

WCD 14 compares a QoS level associated with a first codec in the list with the QoS level for which QoS was reserved (224), and determines whether the QoS level associated with the first codec is less than or equal to the reserved QoS level (226). In this manner, WCD 14 determines whether QoS has been reserved for the first codec of the list. If the QoS level associated with the first codec in the sorted list is less than or equal to the reserved QoS level, WCD 14 keeps the codec on the list of codecs to be included within the SDP offer (228). If the QoS level associated with the first codec in the sorted list is greater than the reserved QoS level, WCD 14 removes the codec from the list of codecs to be included within the SDP offer (230).

After making the determination of whether or not to keep the first codec on the list, WCD 14 then determines whether there are any other codecs remaining in the sorted list of codecs (232). If there are more codecs on the sorted list of codecs, WCD 14 compares the level associated with the next codec on the list to the reserved QoS level to determine whether or not to keep the codec on the list of codecs to include in the SDP offer as described above with respect to the first codec on the list. WCD continues to compare the levels associated with the codecs of the list with the reserved QoS level until all codecs 30 on the list have been analyzed.

When WCD 14 has determined whether QoS has been reserved for each of the codecs of the list of supported codecs, WCD 14 determines whether there are any codecs for which QoS has been reserved (234). For example, WCD 14 may check to see if there are any codecs remaining on the list. As described above, if QoS has been reserved for a codec i.e., the QoS level associated with the codec is less than or equal to the reserved QoS level, WCD 14 keeps the codec on the list. If QoS has been reserved for one or more codecs on the list, WCD 14 generates and sends a SIP message that includes an SDP offer listing the codecs for which QoS has been reserved (236). The SDP offer also includes a number of other preconditions that the terminating device must meet in order to establish a communication session with WCD 14.

If QoS has not been reserved for any codecs on the list, WCD 14 identifies a QoS mode of WCD 14 (238). If WCD 14 is operating in the QoS required mode, WCD 14 aborts the session establishment before sending an INVITE request (240). If WCD 14 is operating in the QoS preferred mode, WCD 14 generates and sends an SDP offer listing the all codecs supported by WCD 14 and suitable for use in communication over the underlying access technology (242). The list of codecs included in the SDP offer may be ordered based on priority as described above.

Figure 8:
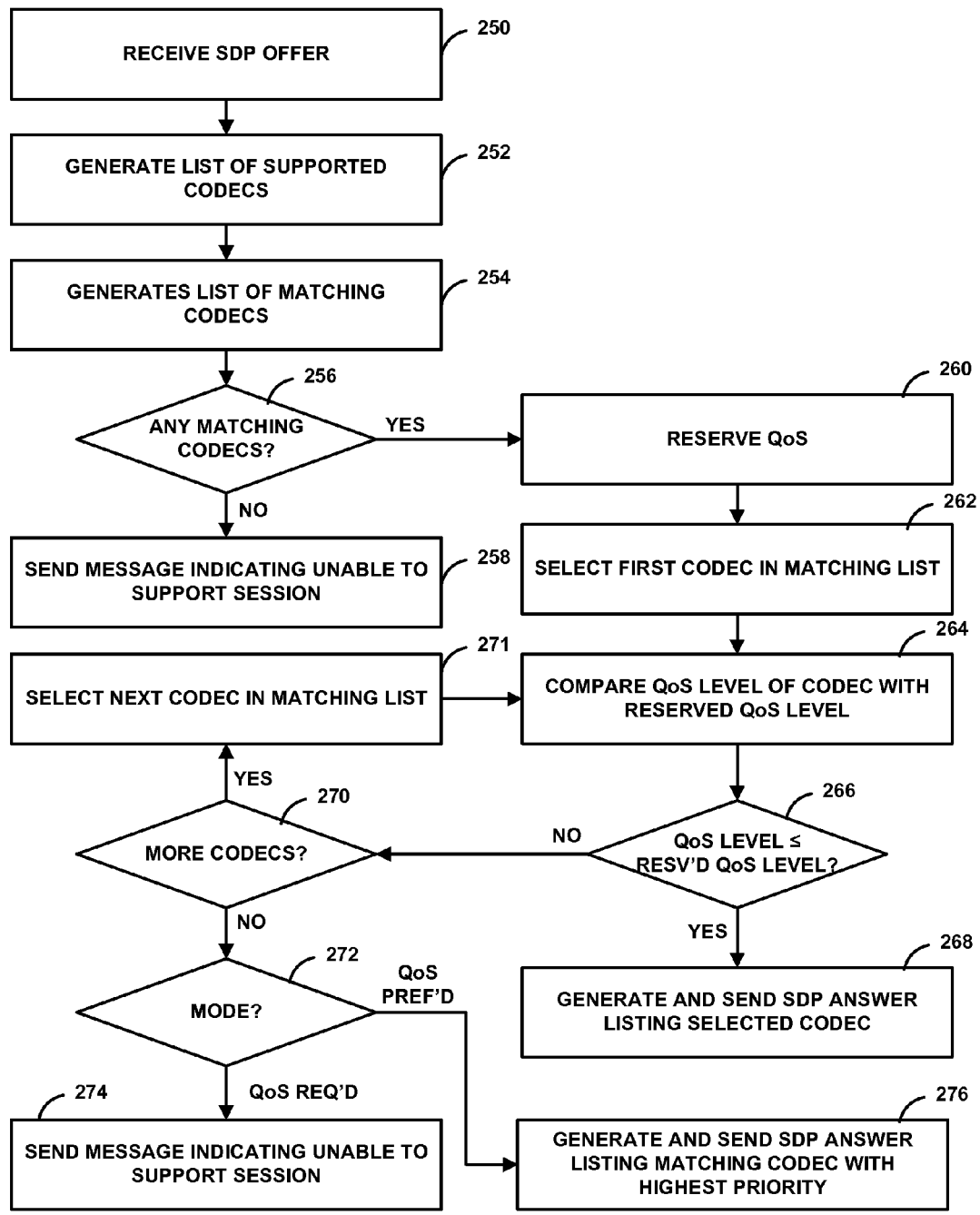
FIG. 8 is a flow diagram illustrating exemplary operation of a communication device receiving an SDP offer and selecting a subset of codecs based on the QoS mode of the device.

FIG. 8 is a flow diagram illustrating exemplary operation of a communication device, such as WCD 14 of FIG. 2, receiving an SDP offer and selecting a subset of codecs based on the QoS mode of WCD 14. In this case, WCD 14 is operating as a terminating device in the SIP session. Initially, WCD 14 receives the SDP offer from proxy server 20A (250). The SDP offer includes a list of offered codecs that the transmitting device, e.g., communication device 16 of FIG. 1, supports. The SDP offer may also include additional preconditions that WCD 14 must satisfy in order to establish the communication session.

WCD 14 retrieves codec configuration information 36 from memory 34, and generates a list of codecs 30 that supported by WCD 14 and suitable for use in communication over the underlying access technology (252). WCD 14 may arrange the list of codecs 30 based on a priority associated with codecs 30, e.g., in a descending order based on a priority.

WCD 14 generates a list of codecs that are included in list of codecs contained in the SDP offer and supported by WCD 14, referred to herein as the list of matching codecs (254). The list of matching codecs may be sorted in an order of preference of the local device, i.e., WCD 14. WCD 14 determines whether there are any codecs included in the list of matching codecs (256). If there are no codecs that are included in the list of codecs contained in the SDP offer and supported by WCD 14, WCD 14 returns a message that indicates that WCD 14 is unable to adequately support the session as described (258). For example, WCD 14 may send a 488 response.

If there are codecs that are included in the list of codecs contained in the SDP offer and supported by WCD 14, i.e., the list of matching codecs, WCD 14 attempts to reserve QoS for one or more of the codecs (260). WCD 14 may, for example, attempt to reserve QoS for one or more QoS levels associated with the codecs in descending order of the QoS levels.

WCD 14 selects a first codec from the list of matching codecs (262). WCD 14 compares a QoS level associated with the selected codec in the list of matching codecs with the QoS level for which QoS has been reserved (264), and determines whether the QoS level associated with the selected codec is less than or equal to the reserved QoS level (266). In this manner, WCD 14 determines whether QoS has been reserved for the selected codec of the list. If the QoS level associated with the selected codec in the list of matching codecs is less than or equal to the reserved QoS level, WCD 14 generates an SDP answer listing the selected codec (268).

If the QoS level associated with the selected codec in the list of matching codecs is greater than the reserved QoS level, WCD 14 then determines whether there are any other codecs remaining in the list of matching codecs (270). If there are more codecs in the list of matching codecs, WCD 14 selects the next codec in the list of matching codecs (271) and compares the QoS level associated with the selected codec on the list to the reserved QoS level to determine whether or not to include the codec in the SDP answer. WCD continues to compare the QoS levels associated with the codecs of the list of matching codecs with the reserved QoS level until a QoS level associated with one of the codecs is less than or equal to the reserved QoS level or no more codecs remain in the matching list.

When there are no more codecs in the list of matching codecs, WCD 14 identifies a QoS mode of WCD 14 (272). If WCD 14 is operating in the QoS required mode, WCD 14 aborts the session establishment (274). For example, WCD 14 may send a 488 response to abort the session establishment. Additionally, WCD 14 may release the QoS, if any, that was previously reserved. If WCD 14 is operating in the QoS preferred mode, WCD 14 generates and sends an SDP answer listing the codec in the matching list of codecs with the highest priority (276).

Although in the example described in FIG. 8 only a single codec is included in the SDP answer, WCD 14 may include more than one codec in the SDP answer. In the QoS preferred mode, for example, WCD 14 may generate an SDP answer that includes all of the codecs in the matching list when none of the codecs have levels that are less than or equal to the reserved QoS level. Likewise, WCD 14 may compare the QoS levels of all codecs of the matching list to the reserved QoS level, and generate an SDP answer that includes all of the codecs of the matching list that have a QoS level that is less than or equal to the reserved QoS level.

Figure 9:
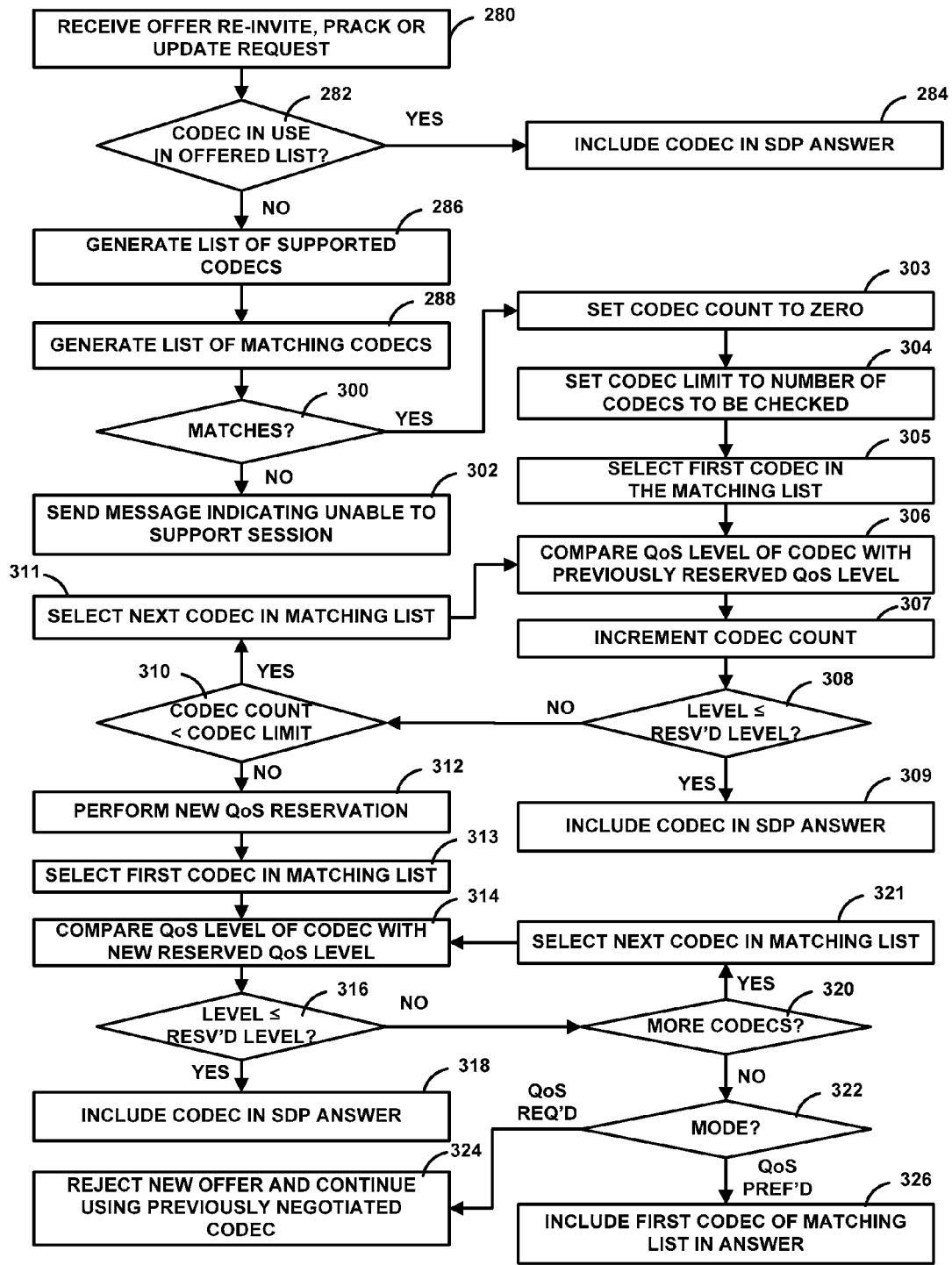
FIG. 9 is a flow diagram illustrating exemplary operation of a communication device receiving an additional SDP offer in a subsequent call-control message, and selecting a subset of codecs based on the QoS mode of the device.

FIG. 9 is a flow diagram illustrating exemplary operation of a communication device, such as WCD 14 of FIG. 2, receiving an SDP offer in a subsequent request, and selecting a subset of codecs based on the QoS mode of WCD 14. WCD 14 may, for example receive a subsequent offer in a mid-dialog request, such as a PRACK request, UPDATE request, or re-INVITE request. The subsequent SDP offer is received after a codec has previously been selected based on a previous offer-answer exchange. The subsequent offer may, therefore, necessitate codec switching in the manner described below.

WCD 14 receives a subsequent SDP offer in a mid-dialog request (280). The subsequent SDP offer includes a list of offered codecs that the transmitting device, e.g., communication device 16 of FIG. 1, supports. The SDP offer may also include additional preconditions that WCD 14 must satisfy in order to establish the communication session.

WCD 14 determines whether the codec selected based on the previous offer-answer exchange is included within the list of offered codecs (282). If the codec selected based on the previous offer-answer exchange is included within the list of offered codecs, WCD 14 selects the previously selected codec and sends an SDP answer that identifies the previously selected codec (284). If the codec selected based on the previous offer-answer exchange is not included within the list of offered codecs, WCD 14 retrieves codec configuration information 36 from memory 34, and generates a list of codecs that are supported by WCD 14 and suitable for use in communication over the underlying access technology (286).

WCD 14 generates a list of codecs that are included in list of codecs contained in the SDP offer and supported by WCD 14, referred to herein as the list of matching codecs (288). The list of matching codecs may be sorted in a preferred order of WCD 14. WCD 14 determines whether there are any codecs included in the list of matching codecs (300). If there are no codecs that are included in the list of codecs contained in the SDP offer and supported by WCD 14, WCD 14 returns a message, such as a 488 response, that indicates that WCD 14 is unable to adequately support the session as described (302).

If there are codecs that are included in the list of codecs contained in the SDP offer and supported by WCD 14, WCD 14 sets a codec count equal to zero (303) and sets a codec limit to the number of codecs to be checked before performing a new QoS reservation (304). WCD 14 selects the first codec in the list (305) and compares a QoS level associated with the first codec in the list of matching codecs with the QoS level for which QoS had been reserved during the previous offer-answer exchange (306). Thus, WCD 14 does not automatically perform a new QoS reservation, but instead first attempts to use QoS reservations that have been previously performed. WCD 14 increments the codec count (307). WCD 14 then determines whether the QoS level associated with the first codec is less than or equal to the previously reserved QoS level (308). In this manner, WCD 14 determines whether QoS has been previously reserved for the first codec of the list. If the QoS level associated with the first codec in the list of matching codecs is less than or equal to the previously reserved QoS level, WCD 14 selects the codec and generates an SDP answer listing the selected codec (309).

If the QoS level associated with the first codec in the list of matching codecs is greater than the previously reserved QoS level, WCD 14 then determines whether codec count is less than codec limit (310). If codec count is less than codec limit, i.e., there are more codecs in the list of matching codecs to check, WCD 14 selects the next codec in the list of matching codecs (311) and compares the QoS level associated with the next codec on the list to the previously reserved QoS level to determine whether or not to select the next codec as the codec to include in the SDP answer. WCD continues to compare the QoS levels associated with the codecs of the list of matching codecs with the previously reserved QoS level until a QoS level associated with one of the codecs is less than or equal to the previously reserved QoS level or no more codecs remain to be checked in the matching list, i.e., codec count equals codec limit.

When there are no more codecs in the list of matching codecs to check, WCD 14 attempts a new QoS reservation (312). In this manner, WCD 14 may be configured to attempt the new QoS reservation at different times. As an example, codec limit may be set equal to one, thus causing WCD 14 to attempt a new QoS reservation after determining that the QoS level associated with the first codec in the matching list is greater than the QoS level previously reserved. This approach allows WCD 14 to maximize the likelihood of selecting the most preferred codec for the communication session. In another example, codec limit may be set equal to the number of codecs in the matching list, thus causing WCD 14 to not attempt a new QoS reservation until it determines that the QoS levels associated with all the codecs in the matching list are greater than the QoS level previously reserved. In this manner, WCD 14 only performs a new QoS reservation when the previous QoS reservation was insufficient. In other words, this approach allows WCD 14 to maximize the likelihood of continuing the session at the original reserved QoS level. WCD 14 may be configured to check any number of codecs contained in the matching list by adjusting the value of codec limit.

After attempting a new QoS reservation, WCD 14 reselects the first codec in the matching list (313) and compares a QoS level associated with the first codec in the list of matching codecs with the newly reserved QoS level (314). WCD 14 determines whether the QoS level associated with the first codec is less than or equal to the new reserved QoS level (316). If the QoS level associated with the first codec in the list of matching codecs is less than or equal to the new reserved QoS level, WCD 14 selects the codec and generates an SDP answer that includes the selected codec (318).

If the QoS level associated with the first codec in the list of matching codecs is greater than the new reserved QoS level, WCD 14 then determines whether there are any other codecs remaining in the list of matching codecs (320). If there are more codecs in the list of matching codecs, WCD 14 selects the next code in the matching list (321) and compares the QoS level associated with the next codec on the list to the new reserved QoS level to determine whether or not to select the next codec as the codec to include in the SDP answer. WCD 14 continues to compare the QoS levels associated with the codecs of the list of matching codecs with the previously reserved QoS level until a QoS level associated with one of the codecs is less than or equal to the new reserved QoS level or no more codecs remain in the matching list.

When there are no more codecs remaining in the matching list, WCD 14 identifies a QoS mode of WCD 14 (322). If WCD 14 is operating in the QoS required mode, WCD 14 rejects the new offer and continues to use the codec negotiated by the previous offer (324). Additionally, WCD 14 adjusts the level of QoS that was previously reserved to the level of QoS associated with the previous codec, if WCD 14 determines such adjustment is necessary. If WCD 14 is operating in the QoS preferred mode, WCD 14 generates and sends an SDP answer listing the codec of the matching list of codecs with the highest priority (326).

Figure 10:
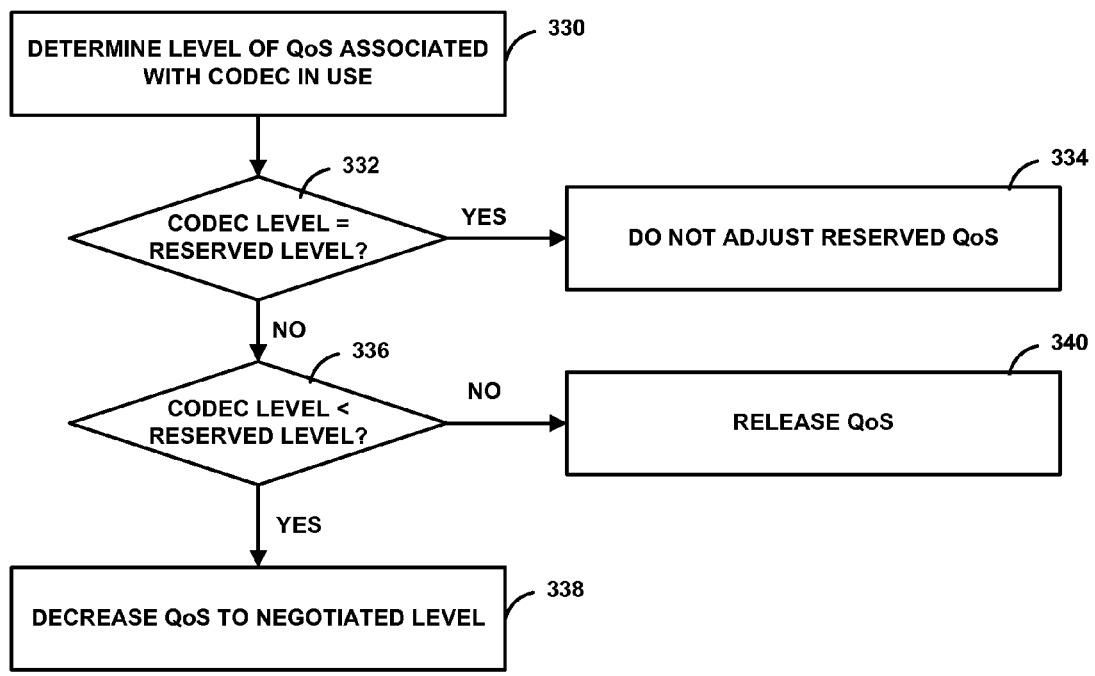
FIG. 10 is a flow diagram illustrating exemplary operation of a communication device adjusting the level of QoS reserved to match the requirements of the codec in use.

FIG. 10 is a flow diagram illustrating exemplary operation of a communication device, such as WCD 14 of FIG. 2, adjusting the level of QoS reserved to match the requirements of the codec in use. WCD 14 may have either overprovisioned the level of QoS reserved, in which case a lower QoS level should be reserved, or underprovisioned the level of QoS, in which case the insufficient QoS is released. The adjusting of the level of QoS reserved may be performed in either an originating device or a terminating device.

WCD 14 determines the level of QoS associated with the codec in use (330). WCD 14 may, for example, retrieve codec configuration information 36 associated with the codec in use from memory 34 to determine the level of QoS associated with the codec. WCD 14 compares the level of QoS associated with the codec in use with the level of QoS reserved. In particular, WCD 14 determines whether the QoS level associated with the codec in use is equal to the reserved QoS level (332). If the QoS level associated with the codec in use is equal to the reserved QoS level, WCD 14 does not adjust the reserved QoS level (334).

If the QoS level associated with the codec in use is not equal to the reserved QoS level, WCD 14 determines whether the QoS level associated with the codec is less than the reserved QoS level (336). If the QoS level associated with the codec is less than the reserved QoS level, which indicates an overprovisioning of QoS, WCD 14 reduces the reserved QoS level to the QoS level of the codec in use (338).

If the QoS level associated with the codec is greater than the reserved QoS level, which indicates underprovisioning of reserved QoS, WCD 14 releases the reserved QoS (340). This situation will only occur when WCD 14 is operating in QoS preferred mode. In the QoS required mode, the only codecs that WCD 14 will use in the communication session must be greater than the QoS level reserved.

The functions described in this disclosure may be implemented in hardware, software, firmware, or any combination thereof If implemented in software, the functions may be stored on or transmitted over as one or more instructions or code on a computer-readable medium associated with a computer program product. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various examples of this disclosure have been described. These and other examples are within the scope of the following claims.

The invention claimed is:

1. A method comprising:
   reserving a quality of service (QoS) reservation that provides a level of QoS for use in a communication session;
   selecting, in an apparatus, a coder/decoder module (codec) from a list of one or more codecs based on the level of QoS of the QoS reservation and a QoS mode of the apparatus, wherein the selected codec is associated with a numerical QoS level that is indicative of QoS requirements of the selected codec; and
   reducing the level of QoS of the QoS reservation when the QoS level of the selected codec is less than the level of QoS of the QoS reservation.

2. The method of claim 1, wherein selecting the codec comprises:
   transmitting a first call control message identifying one or more codecs based on the level of QoS of the QoS reservation and the QoS mode;
   receiving a second call control message identifying one or more codecs that a communication device is configured to support; and
   selecting a matching codec from the first and second call control messages.

3. The method of claim 1, wherein each of the one or more codecs of the list are associated with numerical QoS levels that are less than or equal to the level of QoS of the QoS reservation.

4. The method of claim 1, wherein each of the one or more codecs of the list are associated with numerical QoS levels that are greater than the level of QoS of the QoS reservation when the QoS mode does not require the QoS reservation and no codec is identified having a numerical QoS level that is less than or equal to the level of QoS of the QoS reservation.

5. The method of claim 2, further comprising establishing the communication session using the identified codec for use in the communication session.

6. The method of claim 1, further comprising selecting the QoS mode, wherein the QoS mode is selected from the group consisting of a first QoS mode that requires the QoS reservation and a second QoS mode that prefers but does not require the QoS reservation.

7. The method of claim 6, wherein selecting the QoS mode comprises selecting the QoS mode based on a radio access technology of an access network by which the apparatus accesses a core network.

8. The method of claim 1, wherein the communication session comprises a Voice over Internet Protocol (VoIP) session.

9. The method of claim 1, further comprising releasing the QoS reservation when the QoS level of the selected codec is greater than the level of QoS of the QoS reservation.

10. A method comprising:
reserving a quality of service (QoS) reservation that provides a level of QoS for use in a communication session;
selecting, in an apparatus a coder/decoder module (codec) from a list of one or more codecs based on the level of QoS of the QoS reservation and a QoS mode of the apparatus the selected codec is associated with a numerical QoS level that is indicative of QoS requirements of the selected codec; and
adjusting the level of QoS of the QoS reservation when the level of QoS of the QoS reservation is not equal to the QoS level of the selected codec,
wherein selecting the codec comprises:
transmitting a first call control message identifying one or more codecs based on the level of QoS of the QoS reservation and the QoS mode, wherein each of the one or more codecs are associated with numerical QoS levels that are greater than the level of QoS of the QoS reservation when the QoS mode does not require the QoS reservation and no codec is identified having QoS requirements that are less than or equal to the level of QoS of the QoS reservation;
receiving a second call control message identifying one or more codecs that a communication device is configured to support; and
selecting a matching codec from the first and second call control messages,
wherein adjusting the QoS reservation comprises releasing the QoS reservation when the QoS level of the selected codec is greater than the level of QoS of the QoS reservation.

11. A communication device comprising:
a memory that stores a plurality of coder/decoder modules (codecs);
a codec selection module that selects a codec from a list of one or more codecs based on a level of Quality of Service (QoS) of a QoS reservation and a QoS mode of the device, wherein the selected codec is associated with a numerical QoS level that is indicative of QoS requirements of the selected codec; and
a QoS reservation module that reserves the QoS reservation that provides the level of QoS for use in the communication session and reduces the level of QoS of the QoS reservation when the QoS level of the selected codec is less than the level of QoS of the QoS reservation.

12. The device of claim 11, further comprising:
a processor configured to generate a call control message that identifies one or more codecs based on the level of QoS of the QoS reservation and the QoS mode; and
a transceiver configured to receive a second call control message identifying one or more codecs that a second communication device is configured to support,
wherein the codec selection module selects a matching codec from the first and second call control messages.

13. The device of claim 11, wherein each of the one or more codecs of the list are associated with numerical QoS levels that are less than or equal to the level of QoS of the QoS reservation.

14. The device of claim 11, wherein each of the one or more codecs of the list are associated with numerical QoS levels that are greater than the level of QoS of the QoS reservation when the QoS mode does not require the QoS reservation and no codec is identified having a numerical QoS level that is less than or equal to the level of QoS.

15. The device of claim 12, wherein the processor establishes the communication session using the identified codec for use in the communication session.

16. The device of claim 11, wherein the QoS reservation. module releases the QoS reservation when the QoS level of the selected codec is greater than the QoS level of the QoS reservation.

17. The device of claim 11, wherein the processor selects the QoS mode; and the QoS mode is selected from the group consisting of a first QoS mode that requires the QoS reservation and a second QoS mode that prefers but does not require the QoS reservation.

18. The device of claim 11, wherein the communication session comprises a Voice over Internet Protocol (VoIP) session.

19. A computer program product, comprising:
a non-transitory computer-readable medium, having code stored thereon, comprising:
code to cause at least one computer to reserve a quality of service (QoS) reservation that provides a level of QoS for use in a communication session with an apparatus;
code to cause at least one computer to select a coder/decoder module (codec) from a list of one or more codecs based on the level of QoS of the QoS reservation and a QoS mode of the apparatus, wherein the selected codec is associated with a numerical QoS level that is indicative of QoS requirements of the selected codec; and
code to cause at least one computer to reduce the level of QoS of the QoS reservation when the QoS level of the selected codec is less than the level of QoS of the QoS reservation.

20. The computer program product of claim 19, wherein the code to cause at least one computer to select a codec comprises:
code to a cause at least one computer to transmit a first call control message identifying one or more codecs based on the level of QoS of the QoS reservation and the QoS mode;
code to a cause at least one computer to receive a second call control message identifying one or more codecs that a communication device is configured to support; and
code to a cause at least one computer to select a matching codec from the first and second call control messages.

21. The computer program product of claim 19, wherein each of the one or more codecs of the list are associated with numerical QoS levels that are less than or equal to the level of QoS of the QoS reservation.

22. The computer program product of claim 19, wherein each of the one or more codecs of the list are associated with numerical QoS levels that are greater than the level of QoS of the QoS reservation when the QoS mode does not require the QoS reservation and no codec is identified with a numerical QoS level that is less than or equal to the level of QoS of the QoS reservation.

23. The computer program product of claim 22, wherein the computer-readable medium further comprises code for releasing the QoS reservation when the QoS level of the selected codec is greater than the level of QoS of the QoS reservation.

24. The computer program product of claim 19, wherein the computer-readable medium further comprises code to cause at least one computer to select the QoS mode; wherein the QoS mode is selected from the group consisting of a first QoS mode that requires the QoS reservation and a second QoS mode that prefers but does not require the QoS reservation.

25. A communication device comprising:
means for reserving a quality of service (QoS) reservation that provides a level of QoS for use in a communication session;
means for selecting a coder/decoder module (codec) from a list of one or more codecs based on the level of QoS of the QoS reservation and a QoS mode of the device, wherein the selected codec is associated with a numerical QoS level that is indicative of QoS requirements of the selected codec; and
means for reducing the level of QoS of the QoS reservation when the QoS level of the selected codec is less than the level of QoS of the QoS reservation.

26. The device of claim 25, further comprising:
means for transmitting a first call control message identifying one or more codecs based on the level of QoS of the QoS reservation and the QoS mode; and
means for receiving a second call control message identifying one or more codecs that a second communication device is configured to support,
wherein the selecting means selects a matching codec from the first and second call control messages.

27. The device of claim 25, wherein each of the one or more codecs of the list are associated with numerical QoS levels that are less than or equal to the level of QoS of the QoS reservation.

28. The device of claim 25, wherein each of the one or more codecs of the list are associated with numerical QoS levels that are greater than the QoS level of the QoS reservation when the QoS mode does not require the QoS reservation and no codec is identified with a numerical QoS level that is less than or equal to the level of QoS of the QoS reservation.

29. The device of claim 25, further comprising means for selecting the QoS mode; wherein the QoS mode is selected from the group consisting of a first QoS mode that requires the QoS reservation and a second QoS mode that prefers but does not require the QoS reservation.

30. The device of claim 26, further comprising means for releasing the QoS reservation when the QoS level of the selected codec is greater than the level of QoS of the QoS reservation.

* * * * *